United States Patent
Ly et al.

(10) Patent No.: US 12,389,345 B2
(45) Date of Patent: Aug. 12, 2025

(54) AUTOMATIC GAIN CONTROL IN INTER-BAND CARRIER AGGREGATION WITH SYNCHRONIZATION-SIGNAL-BLOCK-LESS CARRIERS

(71) Applicant: QUALCOMM Incorporated, San Diego, CA (US)

(72) Inventors: Hung Dinh Ly, San Diego, CA (US); Wanshi Chen, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 423 days.

(21) Appl. No.: 17/810,812

(22) Filed: Jul. 5, 2022

(65) Prior Publication Data
US 2024/0015670 A1    Jan. 11, 2024

(51) Int. Cl.
*H04W 52/02* (2009.01)
*H04W 52/52* (2009.01)
(Continued)

(52) U.S. Cl.
CPC ........... *H04W 52/52* (2013.01); *H04W 72/23* (2023.01); *H04W 56/001* (2013.01)

(58) Field of Classification Search
CPC ... H04W 52/52; H04W 72/23; H04W 56/001; H04W 52/0245; H04W 52/0258; H04W 56/0015
See application file for complete search history.

(56) References Cited

U.S. PATENT DOCUMENTS

2019/0044667 A1*  2/2019  Guo .................. H04L 1/1816
2020/0413407 A1* 12/2020  Gulati ................ H04W 52/08
(Continued)

FOREIGN PATENT DOCUMENTS

WO  WO-2020187116 A1 *  9/2020  ............. H04B 1/18
WO  WO-2022133868 A1    6/2022

OTHER PUBLICATIONS

Futurewei: "NR Fast SCell Activation", 3GPP TSG RAN WG1 Meeting #98, R1-1909021, 3rd Generation Partnership Project, Mobile Competence Centre, 650, Route Des Lucioles, F- 06921 Sophia-Antipolis Cedex, France, vol. RAN WG1, No. Prague, Czech Republic, Aug. 26, 2019-Aug. 30, 2023, Aug. 16, 2019, XP051765625, 4 pages.
(Continued)

*Primary Examiner* — Angelica Perez
(74) *Attorney, Agent, or Firm* — Harrity & Harrity LLP

(57) ABSTRACT

Various aspects of the present disclosure generally relate to wireless communication. In some aspects, a user equipment (UE) may receive, from a network node, a configuration of an automatic gain control (AGC) symbol for a synchronization signal block (SSB)-less carrier, wherein the SSB-less carrier and at least one carrier that transmits an SSB are included in a plurality of carriers for inter-band carrier aggregation. The UE may receive, from the network node, an indication of activation of the SSB-less carrier. The UE may measure signal strength on the SSB-less carrier in the AGC symbol for the SSB-less carrier in accordance with the configuration of the AGC for the SSB-less carrier. Numerous other aspects are described.

30 Claims, 14 Drawing Sheets

(51) Int. Cl.
  *H04W 72/23* (2023.01)
  *H04W 56/00* (2009.01)

(56) References Cited

U.S. PATENT DOCUMENTS

| | | | | |
|---|---|---|---|---|
| 2021/0153168 A1* | 5/2021 | Sarkis | ............ | H04W 72/02 |
| 2023/0328664 A1* | 10/2023 | Tang | ............ | H04W 56/0015 |
| | | | | 370/318 |
| 2024/0098757 A1* | 3/2024 | Yu | ............ | H04L 5/0094 |
| 2024/0129936 A1* | 4/2024 | Ganesan | ............ | H04W 72/40 |

OTHER PUBLICATIONS

International Search Report and Written Opinion—PCT/US2023/068837—ISA/EPO—Oct. 19, 2023.
ZTE: "Discussion on Support Efficient Activation/De-Activation Mechanism for SCells in NR CA", 3GPP TSG RAN WG1 #106b-e, R1-2108856, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Sep. 30, 2021, XP052057738, pp. 1-5, pp. 1-4.

\* cited by examiner

AUTOMATIC GAIN CONTROL IN INTER-BAND CARRIER AGGREGATION WITH SYNCHRONIZATION-SIGNAL-BLOCK-LESS CARRIERS

FIELD OF THE DISCLOSURE

Aspects of the present disclosure generally relate to wireless communication and to techniques and apparatuses for automatic gain control (AGC) in inter-band carrier aggregation with a synchronization signal block (SSB)-less carrier.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
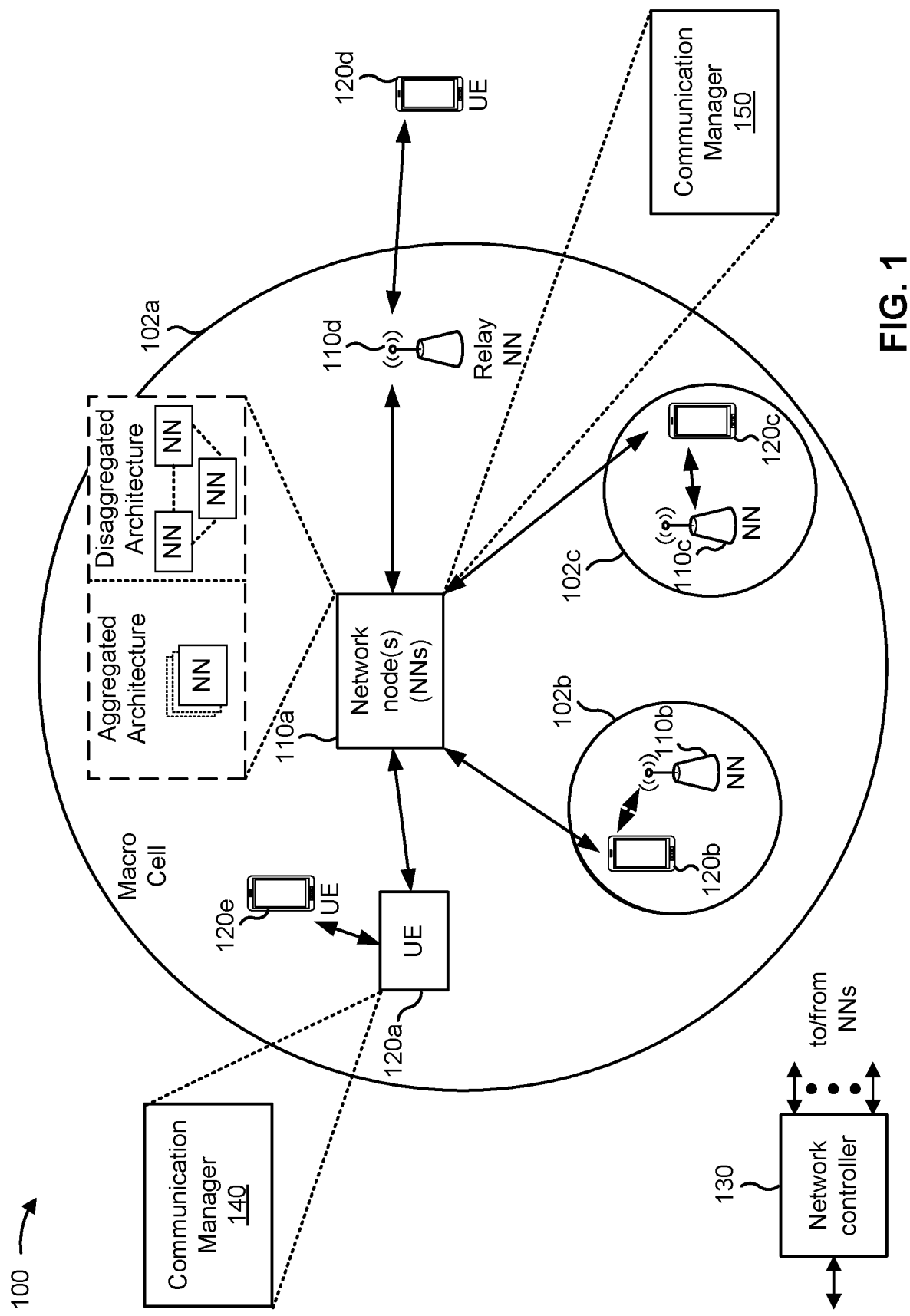
FIG. 1 is a diagram illustrating an example of a wireless network, in accordance with the present disclosure.

Some aspects described herein relate to a user equipment (UE) for wireless communication. The UE may include a memory and one or more processors coupled to the memory. The one or more processors may be configured to receive, from a network node, a configuration of an automatic gain control (AGC) symbol for a synchronization signal block (SSB)-less carrier, wherein the SSB-less carrier and at least one carrier that transmits an SSB are included in a plurality of carriers for inter-band carrier aggregation. The one or more processors may be configured to receive, from the network node, an indication of activation of the SSB-less carrier. The one or more processors may be configured to measure signal strength on the SSB-less carrier in the AGC symbol for the SSB-less carrier in accordance with the configuration of the AGC for the SSB-less carrier.

Some aspects described herein relate to a network node for wireless communication. The network node may include a memory and one or more processors coupled to the memory. The one or more processors may be configured to transmit, to a UE, a configuration of an AGC symbol for an SSB-less carrier, wherein the SSB-less carrier and at least one carrier that transmits an SSB are included in a plurality of carriers for inter-band carrier aggregation. The one or more processors may be configured to transmit, to the UE, an indication of activation of the SSB-less carrier. The one or more processors may be configured to transmit, to the UE in the AGC symbol for the SSB-less carrier, a signal to be measured for AGC on the SSB-less carrier.

Some aspects described herein relate to a method of wireless communication performed by a UE. The method may include receiving, from a network node, a configuration of an AGC symbol for an SSB-less carrier, wherein the SSB-less carrier and at least one carrier that transmits an SSB are included in a plurality of carriers for inter-band carrier aggregation. The method may include receiving, from the network node, an indication of activation of the SSB-less carrier. The method may include measuring signal strength on the SSB-less carrier in the AGC symbol for the SSB-less carrier in accordance with the configuration of the AGC for the SSB-less carrier.

Some aspects described herein relate to a method of wireless communication performed by a network node. The method may include transmitting, to a UE, a configuration of an AGC symbol for an SSB-less carrier, wherein the SSB-less carrier and at least one carrier that transmits an SSB are included in a plurality of carriers for inter-band carrier aggregation. The method may include transmitting, to the UE, an indication of activation of the SSB-less carrier. The method may include transmitting, to the UE in the AGC symbol for the SSB-less carrier, a signal to be measured for AGC on the SSB-less carrier.

Some aspects described herein relate to a non-transitory computer-readable medium that stores a set of instructions for wireless communication by a UE. The set of instructions, when executed by one or more processors of the UE, may cause the UE to receive, from a network node, a configuration of an AGC symbol for an SSB-less carrier, wherein the SSB-less carrier and at least one carrier that transmits an SSB are included in a plurality of carriers for inter-band carrier aggregation. The set of instructions, when executed by one or more processors of the UE, may cause the UE to receive, from the network node, an indication of activation of the SSB-less carrier. The set of instructions, when executed by one or more processors of the UE, may cause the UE to measure signal strength on the SSB-less carrier in the AGC symbol for the SSB-less carrier in accordance with the configuration of the AGC for the SSB-less carrier.

Some aspects described herein relate to a non-transitory computer-readable medium that stores a set of instructions for wireless communication by a network node. The set of instructions, when executed by one or more processors of the network node, may cause the network node to transmit, to a UE, a configuration of an AGC symbol for an SSB-less carrier, wherein the SSB-less carrier and at least one carrier that transmits an SSB are included in a plurality of carriers for inter-band carrier aggregation. The set of instructions, when executed by one or more processors of the network node, may cause the network node to transmit, to the UE, an indication of activation of the SSB-less carrier. The set of instructions, when executed by one or more processors of the network node, may cause the network node to transmit, to the UE in the AGC symbol for the SSB-less carrier, a signal to be measured for AGC on the SSB-less carrier.

Some aspects described herein relate to an apparatus for wireless communication. The apparatus may include means for receiving, from a network node, a configuration of an AGC symbol for an SSB-less carrier, wherein the SSB-less carrier and at least one carrier that transmits an SSB are included in a plurality of carriers for inter-band carrier aggregation. The apparatus may include means for receiving, from the network node, an indication of activation of the SSB-less carrier. The apparatus may include means for measuring signal strength on the SSB-less carrier in the AGC symbol for the SSB-less carrier in accordance with the configuration of the AGC for the SSB-less carrier.

Some aspects described herein relate to an apparatus for wireless communication. The apparatus may include means for transmitting, to a UE, a configuration of an AGC symbol for an SSB-less carrier, wherein the SSB-less carrier and at least one carrier that transmits an SSB are included in a plurality of carriers for inter-band carrier aggregation. The apparatus may include means for transmitting, to the UE, an indication of activation of the SSB-less carrier. The apparatus may include means for transmitting, to the UE in the AGC symbol for the SSB-less carrier, a signal to be measured for AGC on the SSB-less carrier.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, a configuration of an automatic gain control (AGC) symbol for a synchronization signal block (SSB)-less carrier, wherein the SSB-less carrier and at least one carrier that transmits an SSB are included in a plurality of carriers for inter-band carrier aggregation; receive, from the network node, an indication of activation of the SSB-less carrier; and measure signal strength on the SSB-less carrier in the AGC symbol for the SSB-less carrier in accordance with the configuration of the AGC for the SSB-less carrier. Additionally, or alternatively, the communication manager 140 may perform one or more other operations described herein.

In some aspects, the network node 110 may include a communication manager 150. As described in more detail elsewhere herein, the communication manager 150 may transmit, to a UE, a configuration of an AGC symbol for an SSB-less carrier, wherein the SSB-less carrier and at least one carrier that transmits an SSB are included in a plurality of carriers for inter-band carrier aggregation; transmit, to the UE, an indication of activation of the SSB-less carrier; and transmit, to the UE in the AGC symbol for the SSB-less carrier, a signal to be measured for AGC on the SSB-less carrier. Additionally, or alternatively, the communication manager 150 may perform one or more other operations described herein.

As indicated above, FIG. 1 is provided as an example. Other examples may differ from what is described with regard to FIG. 1.

Figure 2:
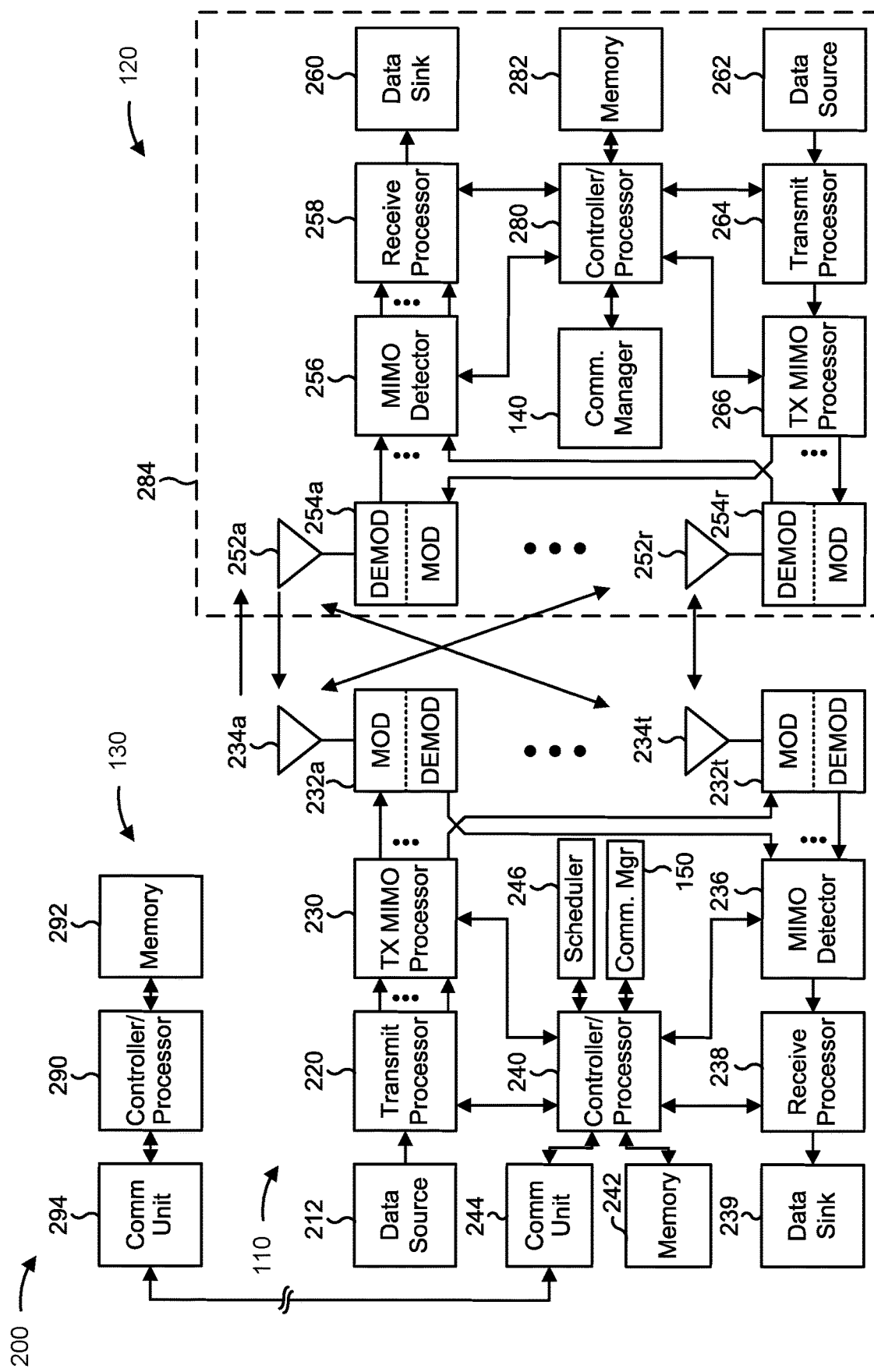
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-14).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-14).

The controller/processor 240 of the network node 110, the controller/processor 280 of the UE 120, and/or any other component(s) of FIG. 2 may perform one or more techniques associated with AGC in inter-band carrier aggregation with an SSB-less carrier, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a network node, a configuration of an AGC symbol for an SSB-less carrier, wherein the SSB-less carrier and at least one carrier that transmits an SSB are included in a plurality of carriers for inter-band carrier aggregation; means for receiving, from the network node, an indication of activation of the SSB-less carrier; and/or means for measuring signal strength on the SSB-less carrier in the AGC symbol for the SSB-less carrier in accordance with the configuration of the AGC for the SSB-less carrier. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node (e.g., network node 110) includes means for transmitting, to a UE, a configuration of an AGC symbol for an SSB-less carrier, wherein the SSB-less carrier and at least one carrier that transmits an SSB are included in a plurality of carriers for inter-band carrier aggregation; means for transmitting, to the UE, an indication of activation of the SSB-less carrier; and/or means for transmitting, to the UE in the AGC symbol for the SSB-less carrier, a signal to be measured for AGC on the SSB-less carrier. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
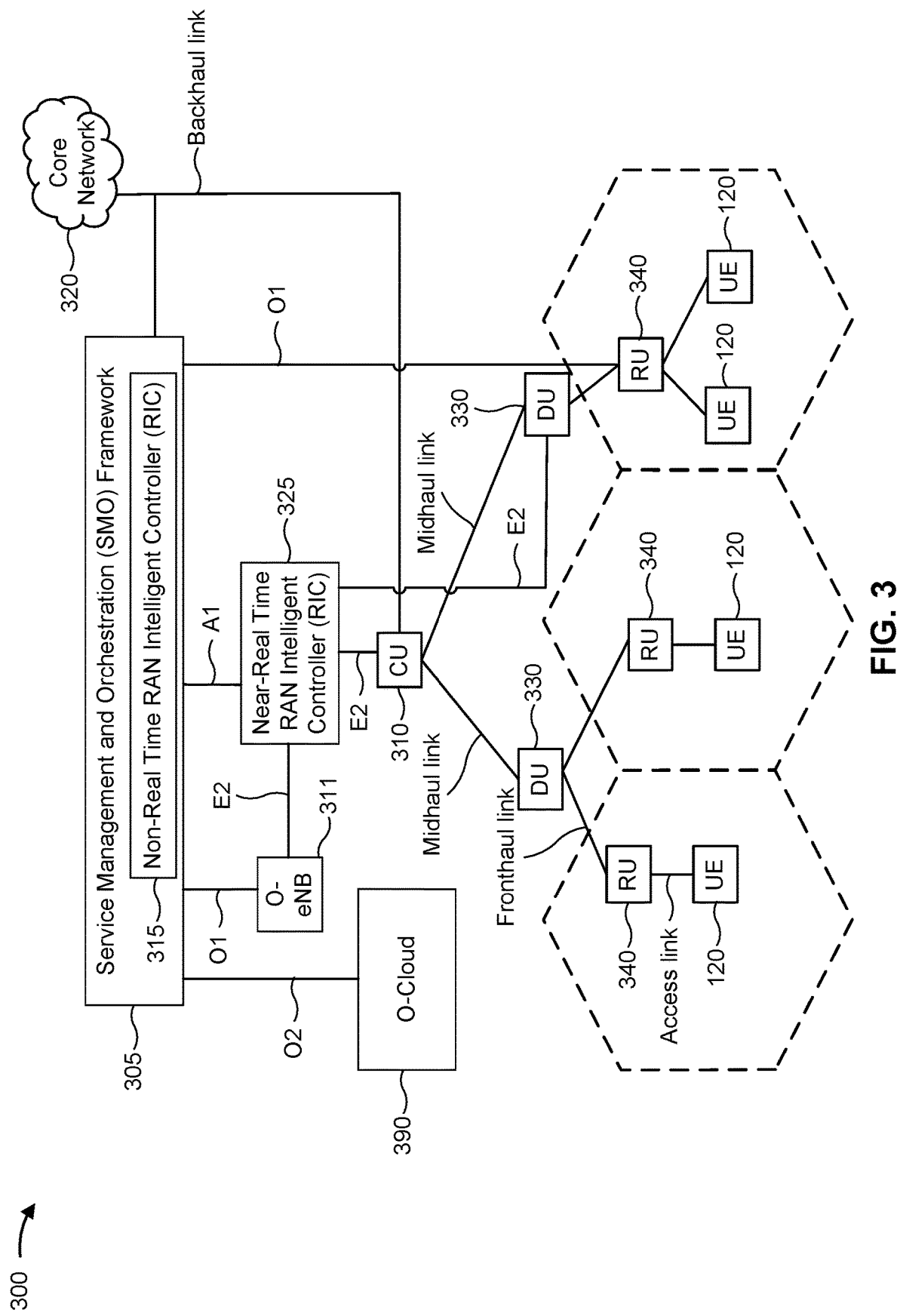
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
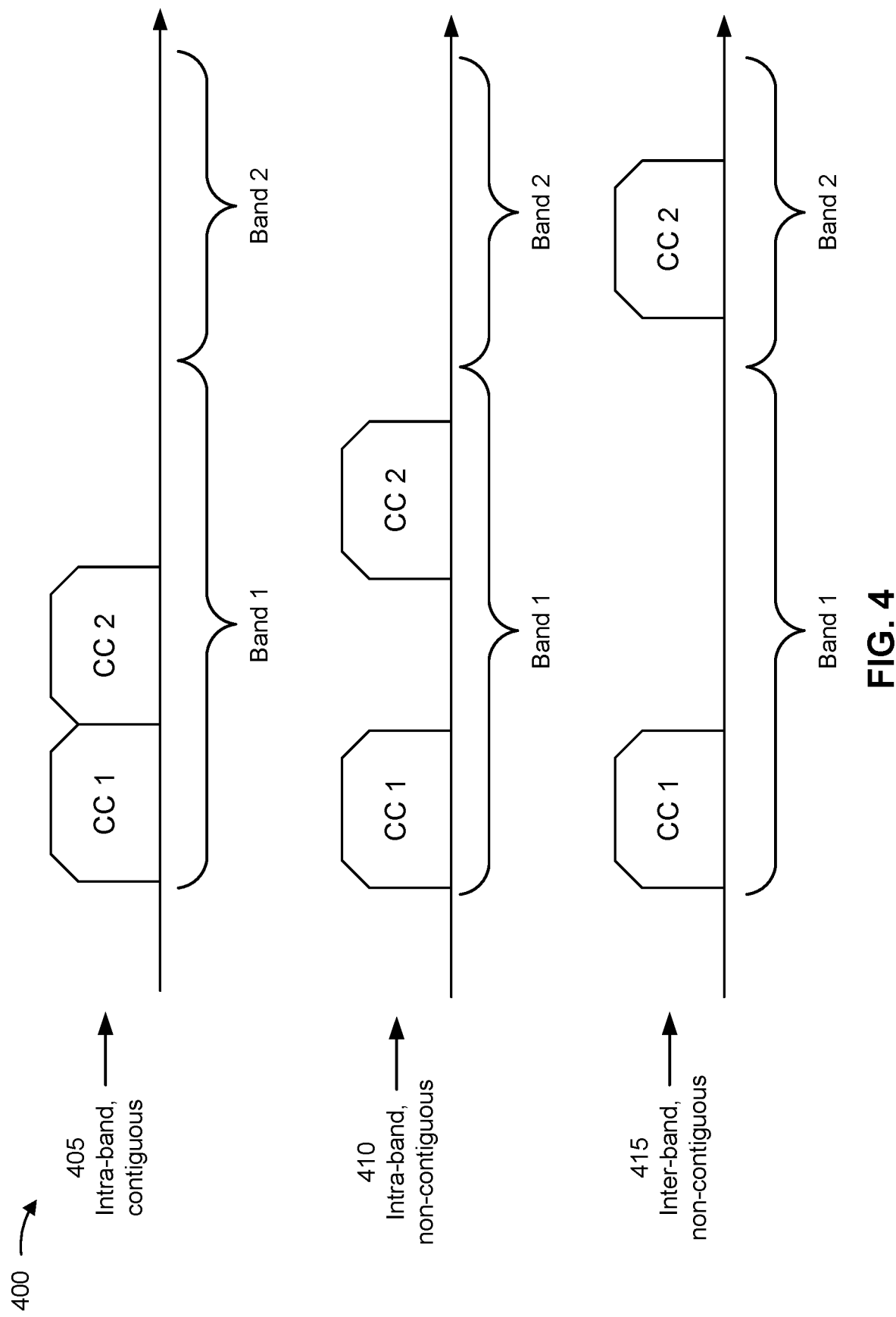
FIG. 4 is a diagram illustrating examples of carrier aggregation, in accordance with the present disclosure.

FIG. 4 is a diagram illustrating examples 400 of carrier aggregation, in accordance with the present disclosure.

Carrier aggregation is a technology that enables two or more component carriers (CCs, sometimes referred to as carriers) to be combined (e.g., into a single channel) for a single UE 120 to enhance data capacity. As shown, carriers can be combined in the same or different frequency bands. Additionally, or alternatively, contiguous or non-contiguous carriers can be combined. A network node 110 may configure carrier aggregation for a UE 120, such as in a radio resource control (RRC) message, downlink control information (DCI), and/or another signaling message.

As shown by reference number 405, in some aspects, carrier aggregation may be configured in an intra-band contiguous mode where the aggregated carriers are contiguous to one another and are in the same band. As shown by reference number 410, in some aspects, carrier aggregation may be configured in an intra-band non-contiguous mode where the aggregated carriers are non-contiguous to one another and are in the same band. As shown by reference number 415, in some aspects, carrier aggregation may be configured in an inter-band non-contiguous mode where the aggregated carriers are non-contiguous to one another and are in different bands.

In carrier aggregation, a UE 120 may be configured with a primary carrier or primary cell (Pcell) and one or more secondary carriers or secondary cells (Scells). In some aspects, the primary carrier may carry control information (e.g., downlink control information and/or scheduling information) for scheduling data communications on one or more secondary carriers, which may be referred to as cross-carrier scheduling. In some aspects, a carrier (e.g., a primary carrier or a secondary carrier) may carry control information for scheduling data communications on the carrier, which may be referred to as self-carrier scheduling or carrier self-scheduling.

As indicated above, FIG. 4 is provided as an example. Other examples may differ from what is described with regard to FIG. 4.

Figure 5:
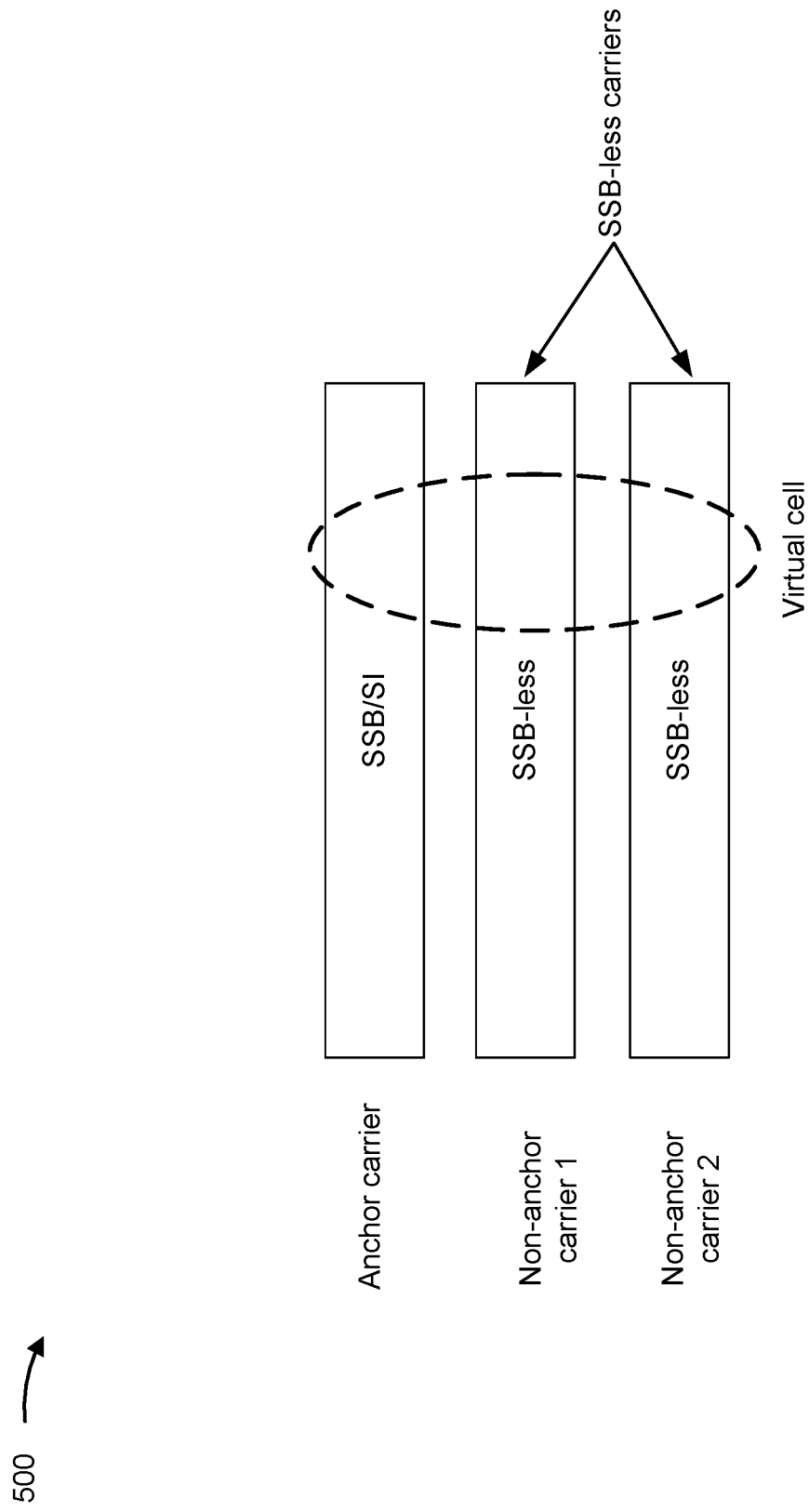
FIG. 5 is a diagram illustrating an example of inter-band carrier aggregation with synchronization signal block (SSB)-less carriers, in accordance with the present disclosure.

FIG. 5 is a diagram illustrating an example 500 of inter-band carrier aggregation with SSB-less carriers, in accordance with the present disclosure.

In some cases, inter-band carrier aggregation (e.g., carrier aggregation with carriers in different frequency bands) may be configured for a UE (e.g., UE 120) with a carrier that transmits SSBs and one or more SSB-less carriers. An SSB-less carrier is a carrier, in a set of aggregate carriers, that does not transmit SSBs. For example, a network node (e.g., network node 110) may not transmit any broadcast transmissions (e.g., SSBs, system information (SI), and/or paging messages) on an SSB-less carrier. As shown in FIG. 5, in example 500, a set of aggregated carriers for inter-band carrier aggregation includes an anchor carrier, on which SSBs are transmitted, and two SSB-less carriers (e.g., non-anchor carrier 1 and non-anchor carrier 2). For example, the anchor carrier may be the Pcell and the anchor carriers may be Scells. In some cases, the set of aggregated carriers may form a virtual cell for communications with a UE. For example, the set of aggregated carriers may be associated with a virtual cell identifier.

The network node may transmit SSBs and SI on the anchor carrier, but not on the non-anchor carriers (e.g., the SSB-less carriers). The SSBs and SI transmitted on the anchor carrier may provide time and frequency synchronization information and SI for the other carriers (e.g., the non-anchor carriers), as well as for the anchor carrier. In some cases, transmitting SSBs on the anchor carrier (e.g., the Pcell), but not on the non-anchor carriers (e.g., the Scells) may improve Scell activation latency (e.g., because the UE does not receive a respective SSB on each Scell). Such improved Scell activation latency may facilitate efficient Scell activation and/or deactivation in accordance with the actual traffic associated with a UE, which may result in network power savings. Furthermore, not transmitting SSBs on the non-anchor carriers (e.g., the Scells) may result in improved resource utilization by reducing downlink overhead. This may allow for deeper network sleep for improved power savings.

In some examples, a transmission of a reference signal or a channel in a frequency band or carrier may have a quasi co-location (QCL) source directly or indirectly associated with an SSB transmitted in the band or carrier. However, an SSB-less carrier may carry no broadcast transmissions (e.g., SSBs, SI, and/or paging messages), and possibly no tracking reference signal (TRS), for network power savings. For example, an SSB-less carrier may carry only control channels and data channels. AGC is an algorithm that is used (e.g., by a UE) to regulate received signal strength (e.g., for downlink communications received from a network node). A UE may perform AGC for the anchor carrier based at least in part on a measurement of a signal included in the SSB (e.g., a PSS, an SSS, and/or a physical broadcast channel (PBCH)). When there is little power difference between an SSB-less carrier and the anchor carrier, the UE may be able to reuse the AGC measurement in the anchor carrier for the SSB-less carrier. However, when the power difference between the SSB-less carrier and the anchor carrier is high (e.g., 3-6 dB), reusing the AGC measurement in the anchor carrier for the SSB-less carrier may cause errors in AGC for the SSB-less carrier that result in unreliable downlink communications in the SSB-less carrier.

In some cases, a network node may activate a reference signal (e.g., a TRS) transmission to the UE for AGC in the SSB-less carrier. In this case, the activation of the reference signal (e.g., a TRS) in the SSB-less carrier may be transmitted from the network node via an Scell activation command in a medium access control (MAC) control element (MAC-CE) or via DCI. However, the activation of the reference signal (e.g., the TRS) for AGC in the SSB-less carrier may result in increased Scell activation latency, because a downlink communication to be transmitted to the UE on the SSB-less carrier cannot be scheduled prior to a transmission occasion of the reference signal (e.g., the TRS) to be used by the UE to perform the AGC measurement.

Some techniques and apparatuses described herein enable a UE to receive, from a network node, a configuration of an AGC symbol for an SSB-less carrier. The SSB-less carrier and at least one carrier that transmits SSBs may be included in a set of aggregated carriers for inter-band carrier aggregation. The UE may receive, from the network node, an indication of activation of the SSB-less carrier, and the UE may perform an AGC measurement on the SSB-less carrier in the AGC symbol for the SSB-less carrier in accordance with the configuration of the AGC symbol for the SSB-less carrier. For example, the UE may measure signal strength on the SSB-less carrier in the AGC symbol for the SSB-less carrier. As a result, the UE may perform AGC for the SSB-less carrier based at least in part on the AGC (e.g., the signal strength) measurement performed on the SSB-less carrier. This may improve accuracy of AGC for SSB-less carriers in the case of inter-band carrier aggregation with SSB-less carriers. In some aspects, the signal transmitted, by the network node, in the AGC symbol for the SSB-less carrier may be the same as the signal transmitted in a next symbol that is subsequent to the AGC symbol. Thus, the signal in the AGC symbol may be transmitted with no transmission activation, resulting in decreased Scell activation latency, as compared with activating transmission of a reference signal (e.g., a TRS) for AGC in the SSB-less carrier.

As indicated above, FIG. 5 is provided as an example. Other examples may differ from what is described with respect to FIG. 5.

Figure 6:
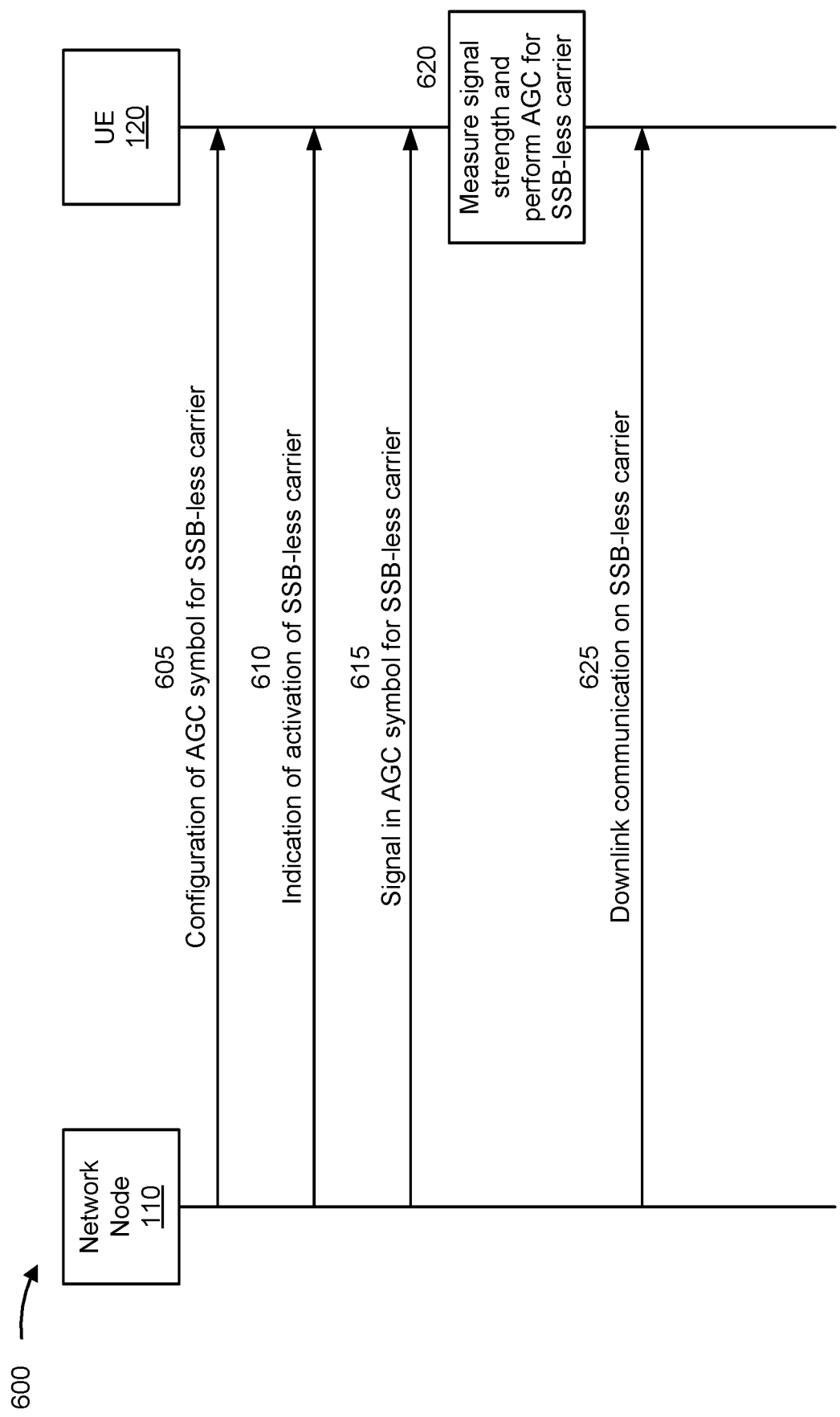
FIGS. 6-10 are diagrams illustrating examples associated with automatic gain control (AGC) in inter-band carrier aggregation with an SSB-less carrier, in accordance with the present disclosure.

FIG. 6 is a diagram illustrating an example 600 associated with AGC in inter-band carrier aggregation with an SSB-less carrier, in accordance with the present disclosure. As shown in FIG. 6, example 600 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

In some aspects, inter-band carrier aggregation may be configured for the UE 120. For example, the network node 110 may configure inter-band carrier aggregation for the UE 120 via an RRC message, DCI, a MAC-CE, and/or another signaling message transmitted from the network node 110 to the UE 120. In this case, a set of aggregated carriers configured for the UE 120 may include a plurality of carriers in different frequency bands. The plurality of carriers may include at least one carrier that transmits SSBs (e.g., one or more SSBs are transmitted on the carrier by the network node 110) and one or more SSB-less carriers. In some aspects, the at least one carrier that transmits SSBs may include a Pcell and/or an anchor carrier. In some aspects, the one or more SSB-less carriers may include one or more Scells and/or non-anchor carriers.

As shown by FIG. 6, and by reference number 605, the network node 110 may transmit, to the UE 120, a configuration of an AGC symbol for an SSB-less carrier included in the set of aggregated carriers for inter-band carrier aggregation. The UE 120 may receive, from the network node 110, the configuration of the AGC symbol for the SSB-less carrier. In some aspects, the network node 110 may transmit the configuration of the AGC symbol for the SSB-less carrier to the UE 120 via an RRC message, a MAC-CE, or DCI. In some aspects, the configuration of the AGC symbol for the SSB-less carrier may be semi-statically configured for the UE 120 (e.g., via an RRC message). In some aspects, the network node 110 may transmit, to the UE 120, a dynamic indication of the configuration of the AGC symbol for the SSB-less carrier (e.g., via a MAC-CE or DCI). In some aspects, the configuration of the AGC symbol for the SSB-less carrier may be transmitted to the UE 120 (e.g., via an RRC message) together with other configuration information that configures the inter-band carrier aggregation for the UE 120. In some aspects, the indication of the configuration of the AGC symbol for the SSB-less carrier may be included in an indication that activates the SSB-less carrier for the UE 120 (e.g., via a MAC-CE or an RRC message). In some aspects, the network node 110 may transmit the configuration of the AGC symbol for the SSB-less carrier to the UE 120 on a carrier that transmits SSBs (e.g., a Pcell or anchor carrier). In some aspects, the network node 110 may transmit the configuration of the AGC symbol for the SSB-less carrier to the UE 120 on another SSB-less carrier that has been activated for the UE 120, and for which AGC has been performed by the UE 120.

The configuration of the AGC symbol for the SSB-less carrier may indicate a location of the AGC symbol within a slot that includes the AGC symbol. For example, the configuration of the AGC symbol for the SSB-less carrier may indicate which symbol, of the slot including the AGC symbol, is to be used as the AGC symbol. In some aspects, the AGC symbol may be a first symbol from the beginning of the slot including the AGC symbol. In this case, the slot including the AGC symbol (or a first occurrence of the slot including the AGC symbol) may be a first slot in which a downlink communication is scheduled to be transmitted to (and received by) the UE 120 on the SSB-less carrier after the SSB-less carrier is activated for the UE 120. In some aspects, the AGC symbol may be in a symbol other than the first symbol in the slot including the AGC symbol and/or the slot including the AGC symbol may be a different slot from the first slot in which a downlink communication is scheduled for the UE 120 on the SSB-less carrier after activation of the SSB-less carrier. For example, in some aspects, the AGC symbol may be a last symbol at an end of the slot including the AGC symbol. In this case, the slot including the AGC symbol (or a first occurrence of the slot including the AGC symbol) may be a last slot prior to the first slot, after activation of the SSB-less carrier, in which a downlink communication is scheduled for the UE 120 on the SSB-less carrier.

In some aspects, the location of the AGC symbol for the SSB-less carrier in the slot including the AGC symbol may be based at least in part on an offset value (K0) indicated in DCI that schedules a downlink communication to be received by the UE 120 on the SSB-less carrier. The offset value (K0) may indicate an offset from a last physical downlink control channel (PDCCH) symbol in which the UE 120 receives the DCI to a start of a scheduled physical downlink shared channel (PDSCH) communication to be received by the UE 120. In some aspects, the location of the AGC symbol may be in the last symbol in the slot including the AGC symbol or in the first symbol in the slot including the AGC symbol based at least in part on the value of K0. In some aspects, the network node 110 may determine the location of the AGC symbol in the slot including the AGC symbol based at least in part on the value of K0 indicated (or to be indicated) in DCI scheduling a first downlink (e.g., PDSCH) communication to be received by the UE 120 on the SSB-less carrier after activation of the SSB-less carrier. In this case, the network node 110 may indicate, in the configuration of the AGC symbol for the SSB-less carrier (e.g., via a MAC-CE or DCI including a dynamic indication of the configuration of the AGC symbol for the SSB-less carrier), the location of the AGC symbol determined based at least in part on the value of K0. In some aspects (e.g., in the case of a semi-static configuration), the configuration of the AGC symbol for the SSB-less carrier may indicate multiple different options for the location of the AGC symbol associated with different K0 values. In this case, the network node 110 may transmit a dynamic indication (e.g., in the indication of activation of the SSB-les carrier) of which option of the location of AGC symbol is to be used by the UE 120 (or which K0 value is to be indicated in the DCI).

In some aspects, the configuration of the AGC symbol for the SSB-less carrier may indicate a slot structure for the slot including the AGC symbol. For example, the slot structure may include the AGC symbol, one or one more PDSCH symbols, one or more PDCCH symbols, and/or one or more other symbols (e.g., uplink symbols and/or flexible symbols).

In some aspects, the configuration of the AGC symbol for the SSB-less carrier may configure a single occurrence of the slot including the AGC symbol. In this case, the occurrence of the slot including the AGC symbol may be configured such that the AGC symbol is prior to a first symbol in which a downlink communication is scheduled for the UE 120 on the SSB-less carrier (after activation of the SSB-less carrier). For example, the slot including the AGC symbol may be a slot prior to a first slot, after activation of the SSB-less carrier, in which a downlink communication (e.g., a PDSCH communication) is scheduled for the UE 120 on the SSB-less carrier, or the slot including the AGC symbol may be the first slot, after activation of the SSB-less carrier, in which a downlink communication (e.g., a PDSCH communication) is scheduled for the UE 120 on the SSB-less carrier (e.g., in a case in which the AGC symbol is the first symbol in the slot).

In some aspects, the configuration of the AGC symbol for the SSB-less carrier may configure periodic occasions of the slot including the AGC symbol for the SSB-less carrier (e.g., for periodic AGC measurements for the SSB-less carrier by the UE 120). In this case, the configuration of the AGC symbol for the SSB-less carrier may indicate a periodicity of the slot including the AGC symbol for the SSB-less carrier. The periodicity may indicate a time duration (e.g., a number of slots) between occasions of the slot including the AGC symbol for the SSB-less carrier. In some aspects, a first occasion of the slot including the AGC symbol may be configured such that the AGC symbol in the first occasion of the slot including the AGC symbol is prior to a first symbol in which a downlink communication is scheduled for the UE 120 on the SSB-less carrier (after activation of the SSB-less carrier). For example, the first occasion of the slot including the AGC symbol may be a slot prior to a first slot, after activation of the SSB-less carrier, in which a downlink communication (e.g., a PDSCH communication) is scheduled for the UE 120 on the SSB-less carrier, or the first occasion of the slot including the AGC symbol may be the first slot, after activation of the after activation of the SSB-less carrier, in which a downlink communication (e.g., a PDSCH communication) is scheduled for the UE 120 on the SSB-less carrier (e.g., in a case in which the AGC symbol is the first symbol in the slot). In this case, the slot including the AGC symbol may be repeated in the occasions after the first occasion in accordance with the periodicity of the slot including the AGC symbol.

In some aspects, as shown in FIG. 6, the UE 120 may receive the configuration of the AGC symbol for the SSB-less carrier from the network node 110. In other aspects, the configuration of the AGC symbol for the SSB-less carrier may be pre-defined or pre-configured for the UE 120. For example, the configuration of the AGC symbol may be defined in the a wireless communications standard (e.g., a 3GPP wireless communications standard). In this case, the UE 120 may store the configuration of the AGC symbol for the SSB-less carrier and apply the configuration of the AGC symbol for the SSB-less carrier without explicit signaling of the configuration of the AGC symbol for the SSB-less carrier from the network node 110 to the UE 120.

As further shown in FIG. 6, and by reference number 610, the network node 110 may transmit, to the UE 120, an indication of activation of the SSB-less carrier. The UE 120 may receive, from the network node 110, the indication of activation of the SSB-less carrier. The indication of activation of the SSB-less carrier may indicate that the SSB-less carrier is activated for the UE 120. In some aspects, the network node 110 may transmit the indication of activation of the SSB-less carrier to the UE 120 via an RRC message (e.g., an RRC reconfiguration message). In some aspects, the network node 110 may transmit the indication (e.g., a dynamic indication) of activation of the SSB-less carrier to the UE 120 via a MAC-CE. In some aspects, the network node 110 may transmit the indication (e.g., a dynamic indication) of the activation of the SSB-less carrier to the UE 120 via DCI. In some aspects, the indication of the activation of the SSB-less carrier may include the configuration of an AGC symbol for the SSB-less carrier. In some aspects, the configuration of the AGC symbol for the SSB-less carrier and the indication of the activation of the SSB-less carrier may be transmitted from the network node 110 to the UE 120 in separate communications. In some aspects, the network node 110 may transmit the indication of the activation of the SSB-less carrier to the UE 120 on a carrier that transmits SSBs (e.g., the Pcell or anchor carrier). In some aspects, the network node 110 may transmit the indication of the activation of the SSB-less carrier to the UE 120 on another SSB-less carrier that was previously activated for the UE 120, and for which the UE 120 has performed AGC.

As further shown in FIG. 6, and by reference number 615, the network node 110 may transmit, to the UE 120 in the AGC symbol for the SSB-less carrier, a signal to be measured for AGC on the SSB-less carrier. The network node 110 may transmit the signal in the AGC symbol in accordance with the configuration for the AGC symbol. For example, the slot that includes the AGC symbol and the location of the AGC symbol in the slot that includes the AGC symbol may be configured in the configuration of the AGC symbol. In some aspects, the signal transmitted in the AGC symbol may be a repetition of the signal transmitted in the next symbol subsequent to the AGC symbol. That is, the network node 110 may repeat the same signal in the AGC symbol and the next symbol, and the repeated signal may be the signal associated with the downlink communication (e.g., a PDCCH or PDSCH communication) transmitted in the next symbol. For example, in a case in which the AGC symbol is the first symbol at the beginning of the slot including the AGC symbol, the signal transmitted in the AGC symbol may be the same signal as the signal transmitted in the second symbol, subsequent to the first symbol, in the slot including the AGC symbol. In a case in which the AGC symbol is a last symbol at the end of the slot including the AGC symbol, the signal transmitted in the AGC symbol may be the same signal as the signal transmitted in the first symbol at the beginning of the next slot subsequent to the slot that includes the AGC symbol.

As further shown in FIG. 6, and by reference number 620, the UE 120 may measure signal strength on the SSB-less carrier in the AGC symbol for the SSB-less carrier, in accordance with the configuration of the AGC symbol for the SSB-less carrier, and the UE 120 may perform AGC for the SSB-less carrier based at least in part on the signal strength measured in the AGC symbol. For example, the slot that includes the AGC symbol and the location of the AGC symbol in the slot that includes the AGC symbol may be configured in the configuration of the AGC symbol. The UE 120 may receive the signal transmitted by the network node 110 in the AGC symbol for the SSB-less carrier, and the UE 120 may perform an AGC measurement on the signal received in the AGC symbol. In some aspects, the AGC measurement may be a measurement of signal strength of the signal received in the AGC symbol for the SSB-less carrier. For example, the AGC measurement may be an RSSI measurement performed on the signal transmitted (on the SSB-less carrier) in the AGC symbol for the SSB-less carrier. The UE 120 may perform AGC for the SSB-less carrier based at least in part on the AGC measurement (e.g., the RSSI measurement) of the signal received in the AGC symbol for the SSB-less carrier. For example, the UE 120 may perform an AGC algorithm (e.g., an AGC loop) based at least in part on the AGC measurement (e.g., the RSSI measurement) to determine adjustments to a receiver gain to be applied to downlink communications received on the SSB-less carrier.

As further shown in FIG. 6, and by reference number 625, the network node 110 may transmit, to the UE 120, a downlink communication on the SSB-less carrier. The UE 120 may receive the downlink communication on the SSB-less carrier. In some aspects, the UE 120 may receive the downlink communication based at least in part on the AGC for the SSB-less carrier. For example, the UE 120 may apply the AGC (e.g., the adjustments to the receiver gain) performed based at least in part on the AGC measurement (e.g., the signal strength measurement) on the SSB-less carrier in the AGC symbol to the downlink communication received on the SSB-less carrier.

In some aspects, the downlink communication may be a PDSCH communication scheduled by DCI transmitted (e.g., in a PDCCH communication) from the network node 110 to the UE 120. In some aspects, the PDSCH communication on the SSB-less carrier may be scheduled via cross-carrier scheduling. In this case, the DCI that schedules the PDSCH communication on the SSB-less carrier may be transmitted to the UE 120 on a carrier other than the SSB-less carrier. For example, the network node 110 may transmit the DCI on a carrier that transmits SSBs (e.g., the Pcell or anchor carrier). In some aspects, the DCI that schedules the PDSCH communication on the SSB-less carrier may also be transmitted to the UE 120 on the SSB-less carrier. In this case, the DCI that schedules the PDSCH communication may be transmitted from the network node 110 to the UE 120 after the AGC symbol for the SSB-less carrier, and the UE 120 may apply the AGC to the PDCCH communication that includes the DCI, as well as to the PDSCH communication.

In some aspects, the UE 120 may apply the AGC performed based at least in part on the AGC measurement on the SSB-less carrier in the AGC symbol for the SSB-less carrier to one or more downlink communications received on the SSB-less carrier. In a case in which the slot including the AGC symbol is configured with periodic occasions, the network node 110 may transmit a signal to be measured for AGC on the SSB-less carrier in the AGC symbol in each occasion of the slot including the AGC symbol for the SSB-less carrier, and the UE 120 may measure the AGC measurement (e.g., the signal strength measurement) on the SSB-less carrier in each occasion of the slot including the AGC symbol for the SSB-less carrier. In this case, the UE 120 may apply the AGC performed based at least in part on the AGC measurement in an occasion of the slot including the AGC symbol for the SSB-less carrier for all downlink communications received on the SSB-less carrier between that occasion and a next occasion of the slot including the AGC symbol for the SSB-less carrier.

In a case in which the configuration of the AGC symbol configures a single occurrence of the slot including the AGC symbol for the SSB-less carrier, the UE 120 may apply the AGC performed based at least in part on the AGC measurement in the AGC symbol for all downlink communications received on the SSB-less carrier until a new configuration of the AGC symbol that configures another occurrence of a slot including the AGC symbol for the SSB-less carrier is received by the UE 120, or until the SSB-less carrier is deactivated for the UE 120.

As indicated above, FIG. 6 is provided as an example. Other examples may differ from what is described with respect to FIG. 6.

Figure 7:
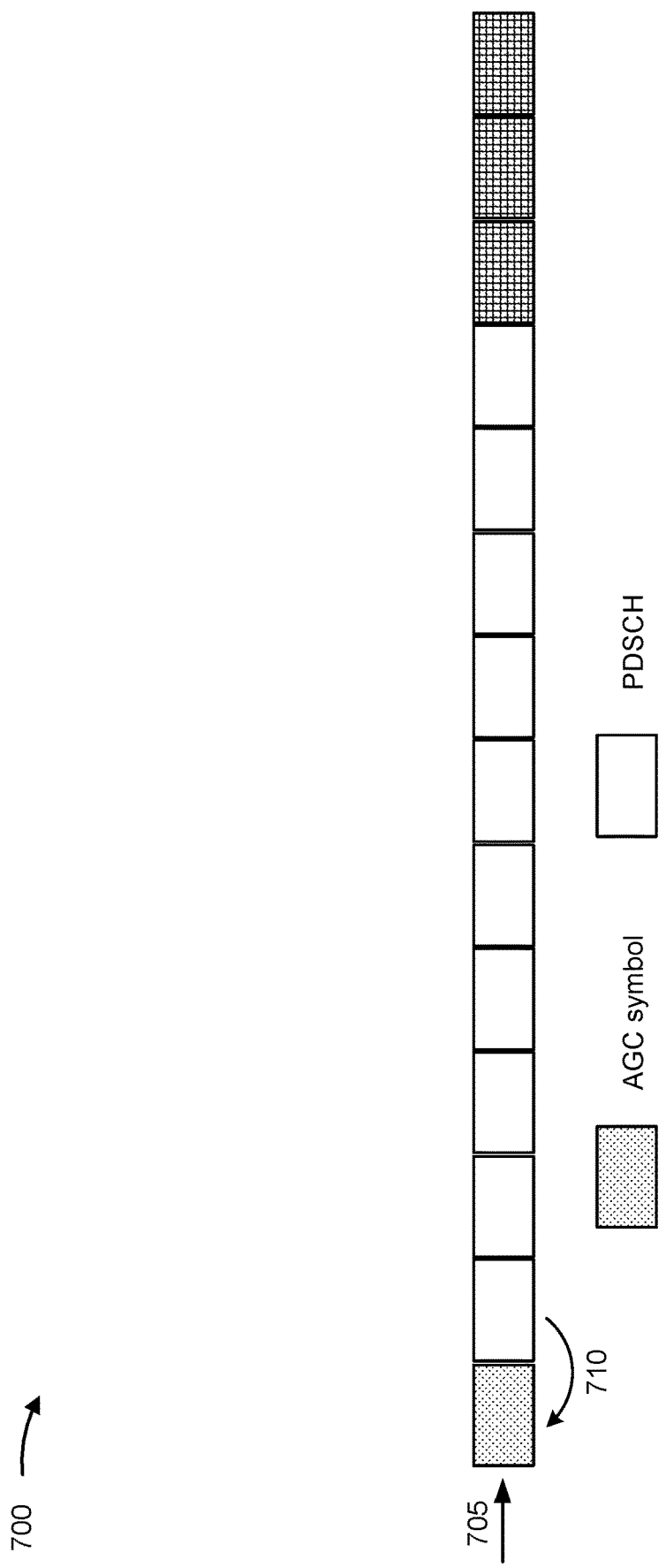

FIG. 7 is a diagram illustrating an example 700 associated with AGC in inter-band carrier aggregation with an SSB-less carrier, in accordance with the present disclosure. As shown in FIG. 7, example 700 shows an example configuration of the AGC symbol for an SSB-less carrier.

As shown in FIG. 7, and by reference number 705, in some aspects, the AGC symbol may be a first symbol from the beginning of the slot including the AGC symbol. As shown by reference number 710, the same signal may be repeated in the AGC symbol and a second symbol, subsequent to the AGC symbol, in the slot including the AGC symbol. That is, the signal transmitted, by the network node 110, in the AGC symbol may be a repetition of the signal that is transmitted in the second symbol (e.g., a PDSCH symbol) in the slot.

As shown in FIG. 7, in some aspects, the slot including the AGC symbol may not include any PDCCH symbols. For example, the slot including the AGC symbol may include the AGC symbol, PDSCH symbols, and uplink or flexible symbols. In this case, the UE 120 may receive, via another carrier (e.g., the anchor carrier), DCI that schedules the reception of a downlink communication (e.g., a PDSCH communication) on the SSB-less carrier in the PDSCH symbols of the slot. In some aspects, in a case in which the AGC symbol is the first symbol in the slot including the AGC symbol, the slot including the AGC symbol (or a first occurrence of the slot including the AGC symbol) may be a first slot, after activation of the SSB-less carrier, in which a downlink communication (e.g., a PDSCH communication) is scheduled to be received by the UE 120 on the SSB-less carrier.

As indicated above, FIG. 7 is provided as an example. Other examples may differ from what is described with respect to FIG. 7.

Figure 8:
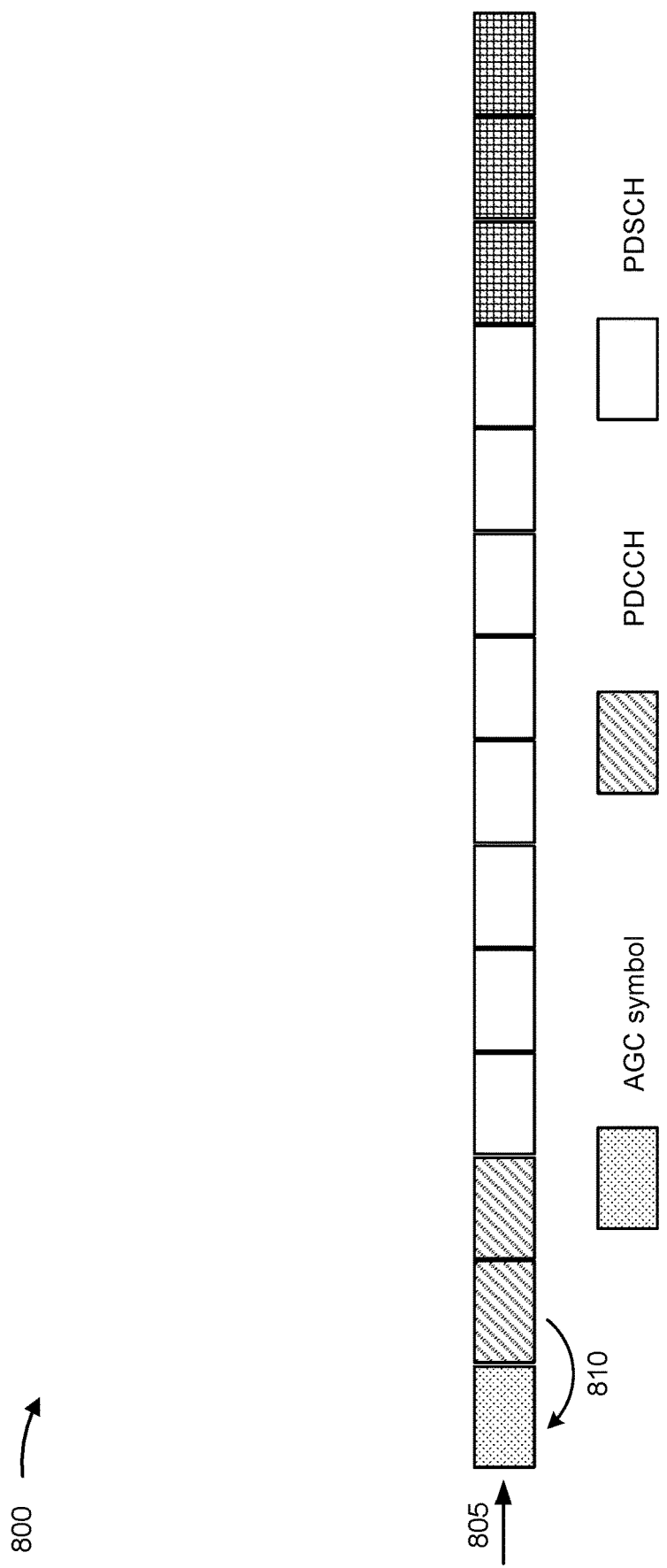

FIG. 8 is a diagram illustrating an example 800 associated with AGC in inter-band carrier aggregation with an SSB-less carrier, in accordance with the present disclosure. As shown in FIG. 8, example 800 shows an example configuration of the AGC symbol for an SSB-less carrier.

As shown in FIG. 8, and by reference number 805, in some aspects, the AGC symbol may be a first symbol from the beginning of the slot including the AGC symbol. As shown by reference number 810, the same signal may be repeated in the AGC symbol and a second symbol, subsequent to the AGC symbol, in the slot including the AGC symbol. That is, the signal transmitted, by the network node 110, in the AGC symbol may be a repetition of the signal that is transmitted in the second symbol (e.g., a PDCCH symbol) in the slot.

As shown in FIG. 8, in some aspects, the slot including the AGC symbol may include the AGC symbol, one or more PDCCH symbols, PDSCH symbols, and other symbols (e.g., uplink or flexible symbols). In this case, the starting symbol for the PDCCH may be the second symbol in the slot including the AGC symbol, and the signal transmitted in the first PDCCH symbol (e.g., the second symbol) is repeated in the AGC symbol. In some aspects, in a case in which the AGC symbol is the first symbol in the slot including the AGC symbol, the slot including the AGC symbol (or a first occurrence of the slot including the AGC symbol) may be a first slot, after activation of the SSB-less carrier, in which a downlink communication (e.g., a PDSCH communication) is scheduled to be received by the UE 120 on the SSB-less carrier.

As indicated above, FIG. 8 is provided as an example. Other examples may differ from what is described with respect to FIG. 8.

Figure 9:
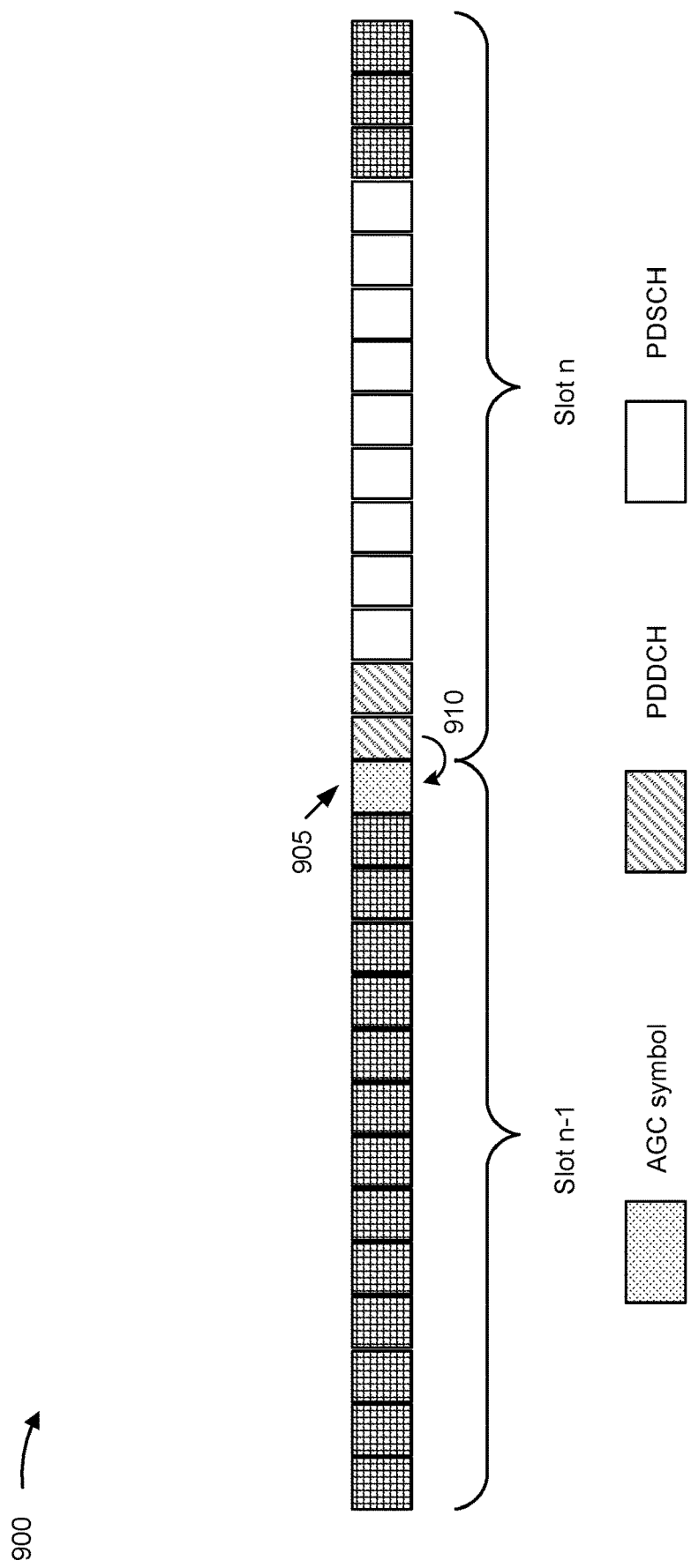

FIG. 9 is a diagram illustrating an example 900 associated with AGC in inter-band carrier aggregation with an SSB-less carrier, in accordance with the present disclosure. As shown in FIG. 9, example 900 shows an example configuration of the AGC symbol for an SSB-less carrier.

As shown in FIG. 9, in some aspects, the slot including the AGC symbol may be different from a first slot, after the activation of the SSB-less carrier, in which a downlink communication (e.g., a PDSCH communication) is scheduled to be received by the UE 120 on the SSB-less carrier. As shown by reference number 905, in some aspects, the AGC symbol may be a last symbol at an end of the slot including the AGC symbol. In this case, the slot including the AGC symbol may be a last slot (slot n−1) prior to a first slot (slot n), after the activation of the SSB-less carrier, in which a downlink communication is scheduled to be received by the UE 120 on the SSB-less carrier. As shown by reference number 910, in a case in which the AGC symbol is the last symbol in slot n−1, the same signal may be repeated in the AGC symbol and a first symbol, at the beginning of slot n. That is, the signal transmitted, by the network node 110, in the AGC symbol may be a repetition of the signal that is transmitted in the first symbol (e.g., a PDCCH symbol) in slot n.

As indicated above, FIG. 9 is provided as an example. Other examples may differ from what is described with respect to FIG. 9.

Figure 10:
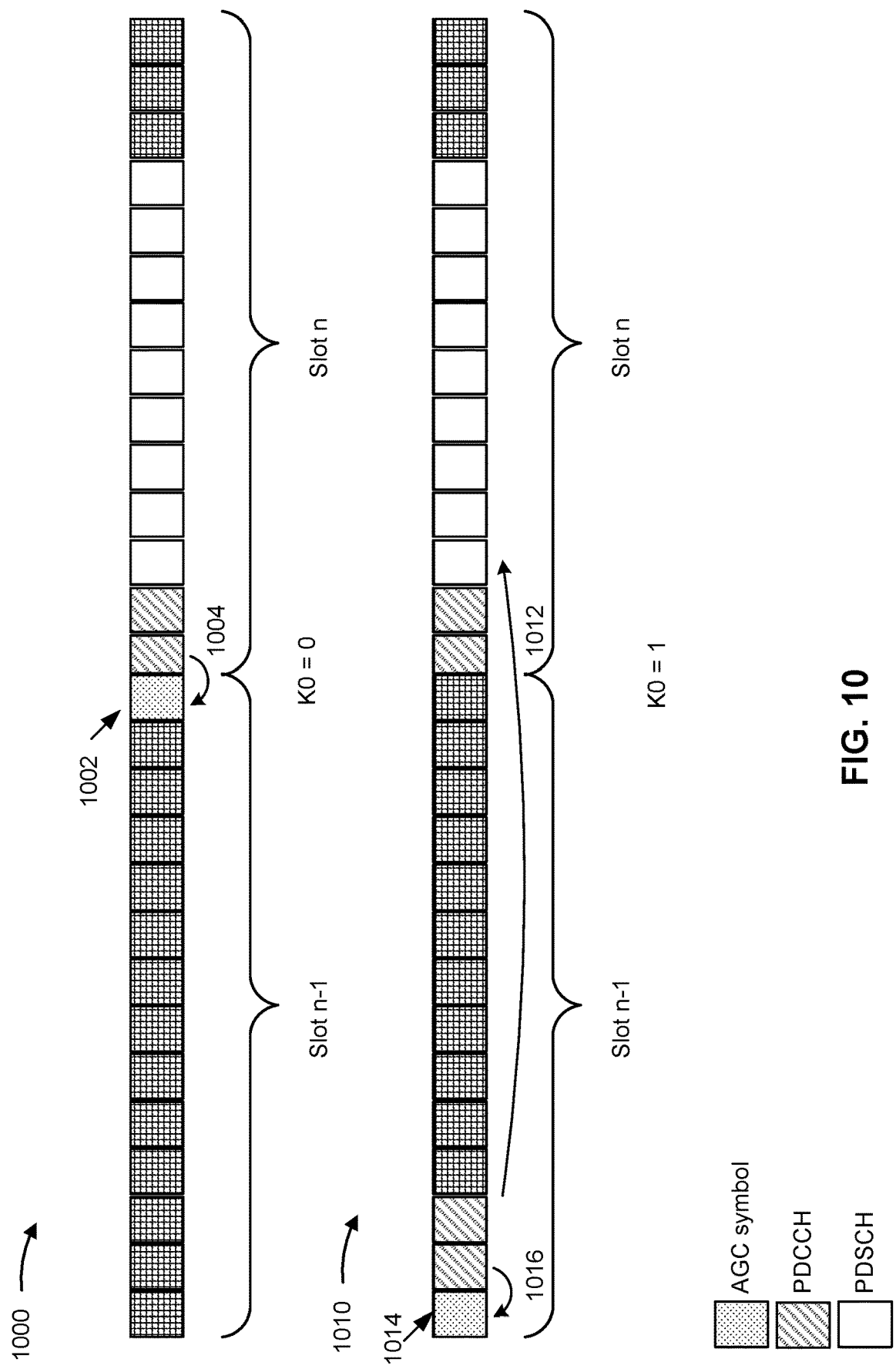

FIG. 10 is a diagram illustrating examples 1000 and 1010 associated with AGC in inter-band carrier aggregation with an SSB-less carrier, in accordance with the present disclosure. As shown in FIG. 10, examples 1000 and 1010 show example configurations of the AGC symbol for an SSB-less carrier that are based at least in part on an offset value (K0) between a last PDCCH symbol in which a UE 120 receives DCI and a PDSCH communication scheduled by the DCI.

As shown in FIG. 10, in some aspects, the location of the AGC symbol for the SSB-less carrier in the slot including the AGC symbol may be based at least in part on the value of K0 indicated in DCI that schedules a downlink communication (e.g., a PDSCH communication) to be received by the UE 120 on the SSB-less carrier. In some aspects, in a case in which K0=0 (e.g., the offset between the DCI and the PDSCH communication scheduled by the DCI is equal to zero slots), the location of the AGC symbol may be in a last symbol in the slot including the AGC symbol, and the slot including the AGC symbol may be a last slot prior to a slot in which the downlink communication on the SSB-less carrier is scheduled (e.g., a last slot prior to a first slot, after activation of the SSB-less carrier, in which a downlink communication is scheduled for the UE 120 on the SSB-less carrier). In some aspects, in a case in which K0>0 (e.g., the offset between the DCI and the PDSCH communication scheduled by the DCI is greater than zero slots), the location of the AGC symbol may be in a first symbol in the slot including the AGC symbol, and the slot including the AGC symbol may be one or more slots prior to the slot in which the downlink communication is scheduled. For example, in a case in which K0>0 and the PDSCH communication is scheduled in slot n, the location of the AGC symbol may be in a first symbol in the slot including the AGC symbol, and the slot including the AGC symbol may slot n−K0 (e.g., the slot in which the DCI scheduling the PDSCH communication is transmitted to the UE 120).

As shown in FIG. 10, example 1000 shows an example configuration of the AGC symbol for the SSB-less carrier in a case in which K0=0. As shown in example 1000, in the case in which K0=0, DCI received by the UE 120 in slot n may schedule a PDSCH communication to be received by the UE 120 in slot n. As shown by reference number 1002, in the case in which K0=0, the location of the AGC symbol may be in a last symbol of slot n−1 (e.g., the last slot prior to slot n). As shown by reference number 1004, in the case in which the AGC symbol is the last symbol in slot n−1, the same signal may be repeated in the AGC symbol and a first symbol, at the beginning of slot n. That is, the signal transmitted, by the network node 110, in the AGC symbol may be a repetition of the signal that is transmitted in the first symbol in slot n.

As further shown in FIG. 10, example 1010 shows an example configuration of the AGC symbol for the SSB-less carrier in a case in which K0=1. As shown in by reference number 1012, in the case in which K0=1, DCI received by the UE 120 in slot n−1 may schedule a PDSCH communication to be received by the UE 120 in slot n. As shown by reference number 1014, in the case in which K0=1, the location of the AGC symbol may be in a first symbol of slot n−1 (e.g., the first symbol of slot n−K0). As shown by reference number 1016, in the case in which the AGC symbol is the first symbol in slot n−1, the same signal may be repeated in the AGC symbol and the second symbol in slot n−1. That is, the signal transmitted, by the network node 110, in the AGC symbol may be a repetition of the signal that is transmitted in the second symbol in slot n−1.

As indicated above, FIG. 10 is provided as an example. Other examples may differ from what is described with respect to FIG. 10.

Figure 11:
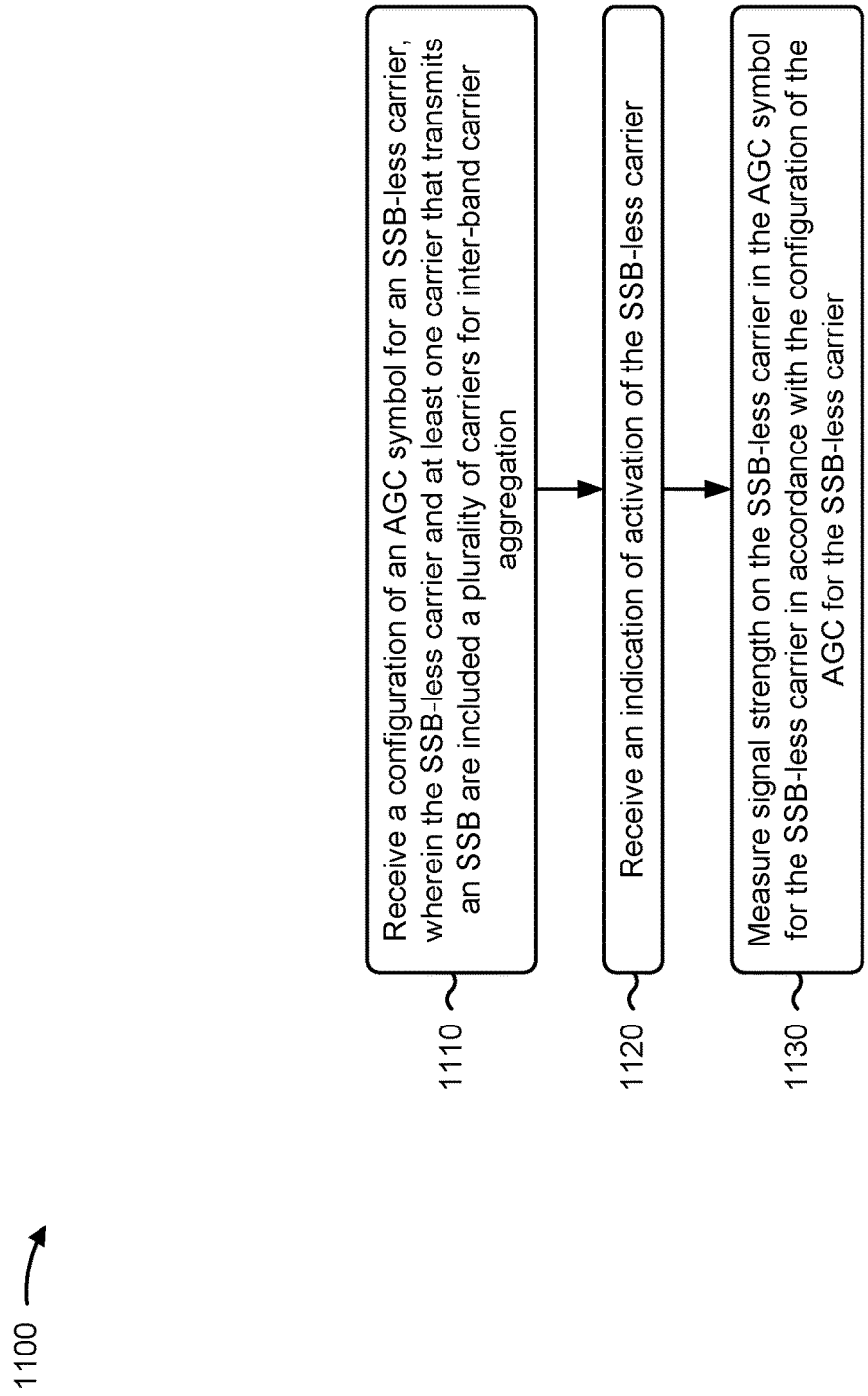
FIGS. 11-12 are diagrams illustrating example processes associated with AGC in inter-band carrier aggregation with an SSB-less carrier, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with AGC in inter-band carrier aggregation with an SSB-less carrier.

As shown in FIG. 11, in some aspects, process 1100 may include receiving, from a network node, a configuration of an AGC symbol for an SSB-less carrier, wherein the SSB-less carrier and at least one carrier that transmits an SSB are included in a plurality of carriers for inter-band carrier aggregation (block 1110). For example, the UE (e.g., using communication manager 140 and/or reception component 1302, depicted in FIG. 13) may receive, from a network node, a configuration of an AGC symbol for an SSB-less carrier, wherein the SSB-less carrier and at least one carrier that transmits an SSB are included in a plurality of carriers for inter-band carrier aggregation, as described above.

As further shown in FIG. 11, in some aspects, process 1100 may include receiving, from the network node, an indication of activation of the SSB-less carrier (block 1120). For example, the UE (e.g., using communication manager 140 and/or reception component 1302, depicted in FIG. 13) may receive, from the network node, an indication of activation of the SSB-less carrier, as described above.

As further shown in FIG. 11, in some aspects, process 1100 may include measuring signal strength on the SSB-less carrier in the AGC symbol for the SSB-less carrier in accordance with the configuration of the AGC for the SSB-less carrier (block 1130). For example, the UE (e.g., using communication manager 140 and/or measurement component 1308, depicted in FIG. 13) may measure signal strength on the SSB-less carrier in the AGC symbol for the SSB-less carrier in accordance with the configuration of the AGC for the SSB-less carrier, as described above.

Process 1100 may include additional aspects, such as any single aspect or any combination of aspects described below and/or in connection with one or more other processes described elsewhere herein.

In a first aspect, process 1100 includes performing AGC for the SSB-less carrier based at least in part on the signal strength measured in the AGC symbol.

In a second aspect, process 1100 includes receiving, from the network node, a downlink communication on the SSB-less carrier based at least in part on the AGC for the SSB-less carrier.

In a third aspect, the AGC symbol is a first symbol at a beginning of a slot including the AGC symbol.

In a fourth aspect, the slot including the AGC symbol is a first slot, after the activation of the SSB-less carrier, in which a downlink communication is scheduled to be received by the UE on the SSB-less carrier.

In a fifth aspect, a same signal is repeated in the AGC symbol and is a second symbol, subsequent to the AGC symbol, in the slot including the AGC symbol.

In a sixth aspect, the slot including the AGC symbol does not include any PDCCH symbols.

In a seventh aspect, the slot including the AGC symbol includes one or more PDCCH symbols that begin in a second symbol, subsequent to the AGC symbol, in the slot including the AGC symbol.

In an eighth aspect, the AGC symbol is a last symbol at an end of a slot including the AGC symbol.

In a ninth aspect, the slot including the AGC symbol is a last slot prior to a first slot, after the activation of the SSB-less carrier, in which a downlink communication is scheduled to be received by the UE on the SSB-less carrier.

In a tenth aspect, a same signal is repeated in the AGC symbol as in a first symbol at a beginning of a next slot, subsequent to the slot including the AGC symbol.

In an eleventh aspect, a location of the AGC symbol in a slot including the AGC symbol is based at least in part on an offset value, included in DCI, between the DCI and a downlink communication scheduled by the DCI to be received by the UE on the SSB-less carrier.

In a twelfth aspect, in connection with the offset value being equal to zero slots, the location of the AGC symbol is in a last symbol in the slot including the AGC symbol and the slot including the AGC symbol is a last slot prior to a slot in which the downlink communication is scheduled.

In a thirteenth aspect, in connection with the offset value being greater than zero slots, the location of the AGC symbol is a first symbol in the slot including the AGC symbol and the slot including the AGC symbol is one or more slots prior to the slot in which the downlink communication is scheduled.

In a fourteenth aspect, the configuration of the AGC symbol for the SSB-less carrier indicates a periodicity of a slot including the AGC symbol for the SSB-less carrier.

In a fifteenth aspect, measuring signal strength on the SSB-less carrier in the AGC symbol for the SSB-less carrier includes measuring the signal strength on the SSB-less carrier in the AGC symbol for the SSB-less carrier in each of one or more occasions of the slot including the AGC symbol for the SSB-less carrier based at least in part on the periodicity of the slot including the AGC symbol for the SSB-less carrier.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
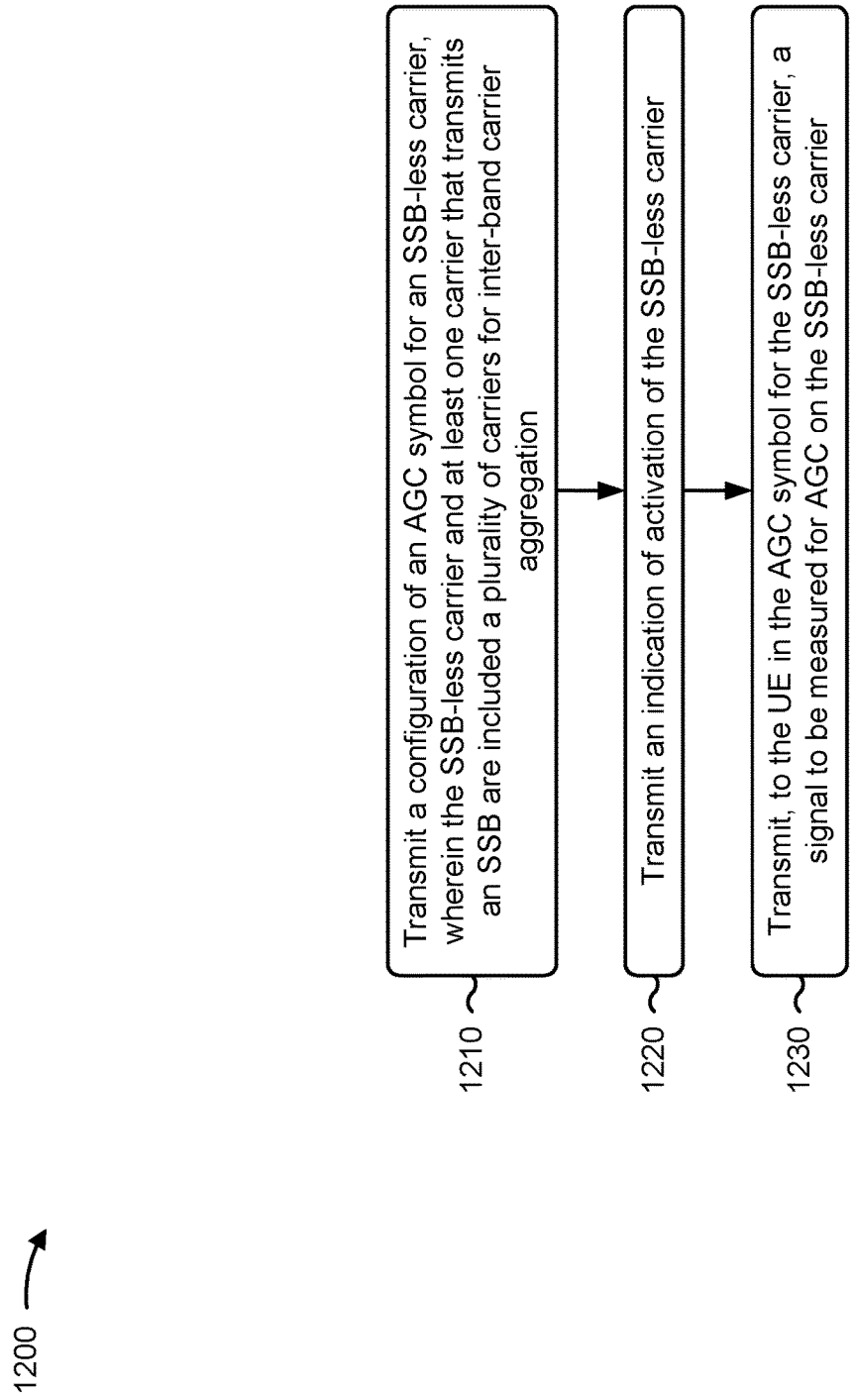

FIG. 12 is a diagram illustrating an example process 1200 performed, for example, by a network node, in accordance with the present disclosure. Example process 1200 is an example where the network node (e.g., network node 110) performs operations associated with AGC in inter-band carrier aggregation with an SSB-less carrier.

As shown in FIG. 12, in some aspects, process 1200 may include transmitting, to a UE, a configuration of an AGC symbol for an SSB-less carrier, wherein the SSB-less carrier and at least one carrier that transmits an SSB are included in a plurality of carriers for inter-band carrier aggregation (block 1210). For example, the network node (e.g., using communication manager 150 and/or transmission component 1404, depicted in FIG. 14) may transmit, to a UE, a configuration of an AGC symbol for an SSB-less carrier, wherein the SSB-less carrier and at least one carrier that transmits an SSB are included in a plurality of carriers for inter-band carrier aggregation, as described above.

As further shown in FIG. 12, in some aspects, process 1200 may include transmitting, to the UE, an indication of activation of the SSB-less carrier (block 1220). For example, the network node (e.g., using communication manager 150 and/or transmission component 1404, depicted in FIG. 14) may transmit, to the UE, an indication of activation of the SSB-less carrier, as described above.

As further shown in FIG. 12, in some aspects, process 1200 may include transmitting, to the UE in the AGC symbol for the SSB-less carrier, a signal to be measured for AGC on the SSB-less carrier (block 1230). For example, the network node (e.g., using communication manager 150 and/or transmission component 1404, depicted in FIG. 14) may transmit, to the UE in the AGC symbol for the SSB-less carrier, a signal to be measured for AGC on the SSB-less carrier, as described above.

Process 1200 may include additional aspects, such as any single aspect or any combination of aspects described below and/or in connection with one or more other processes described elsewhere herein.

In a first aspect, process 1200 includes transmitting, to the UE, a downlink communication on the SSB-less carrier after transmitting, in the AGC symbol, the signal to be measured for AGC on the SSB-less carrier.

In a second aspect, the AGC symbol is a first symbol at a beginning of a slot including the AGC symbol.

In a third aspect, the slot including the AGC symbol is a first slot, after the activation of the SSB-less carrier, in which a downlink communication is scheduled to be transmitted to the UE on the SSB-less carrier.

In a fourth aspect, transmitting the signal to be measured for AGC on the SSB-less carrier comprises transmitting a same signal in the AGC symbol as in a second symbol, subsequent to the AGC symbol, in the slot including the AGC symbol.

In a fifth aspect, the slot including the AGC symbol does not include any PDCCH symbols.

In a sixth aspect, the slot including the AGC symbol includes one or more PDCCH symbols that begin in a second symbol, subsequent to the AGC symbol, in the slot including the AGC symbol.

In a seventh aspect, the AGC symbol is a last symbol at an end of a slot including the AGC symbol.

In an eighth aspect, the slot including the AGC symbol is a last slot prior to a first slot, after the activation of the SSB-less carrier, in which a downlink communication is scheduled to be transmitted to the UE on the SSB-less carrier.

In a ninth aspect, transmitting the signal to be measured for AGC on the SSB-less carrier comprises transmitting a same signal in the AGC symbol as in a first symbol at a beginning of a next slot, subsequent to the slot including the AGC symbol.

In a tenth aspect, a location of the AGC symbol in a slot including the AGC symbol is based at least in part on an offset value, included in DCI, between the DCI and a downlink communication scheduled by the DCI to be transmitted to the UE on the SSB-less carrier.

In an eleventh aspect, in connection with the offset value being equal to zero slots, the location of the AGC symbol is in a last symbol in the slot including the AGC symbol and the slot including the AGC symbol is a last slot prior to a slot in which the downlink communication is scheduled.

In a twelfth aspect, in connection with the offset value being greater than zero slots, the location of the AGC symbol is a first symbol in the slot including the AGC symbol and the slot including the AGC symbol is one or more slots prior to the slot in which the downlink communication is scheduled.

In a thirteenth aspect, the configuration of the AGC symbol for the SSB-less carrier indicates a periodicity of a slot including the AGC symbol for the SSB-less carrier.

In a fourteenth aspect, transmitting the signal to be measured for AGC on the SSB-less carrier includes transmitting the signal to be measured for the AGC on the SSB-less carrier in the AGC symbol for the SSB-less carrier in each of one or more occasions of the slot including the AGC symbol for the SSB-less carrier based at least in part on the periodicity of the slot including the AGC symbol for the SSB-less carrier.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
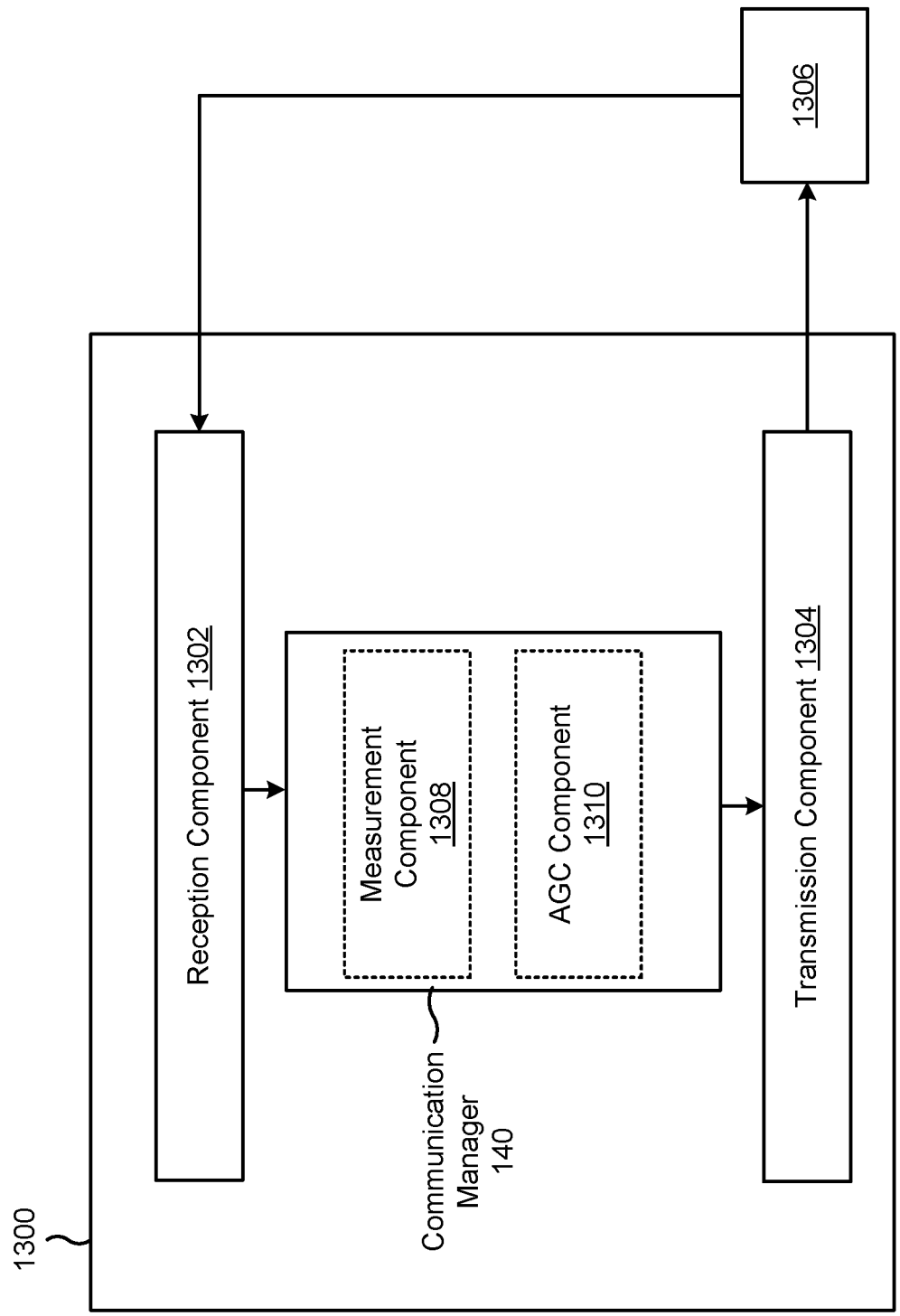
FIGS. 13-14 are diagrams of an example apparatuses for wireless communication, in accordance with the present disclosure.

FIG. 13 is a diagram of an example apparatus 1300 for wireless communication, in accordance with the present disclosure. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include one or more of a measurement component 1308 and/or an AGC component 1310, among other examples.

In some aspects, the apparatus 1300 may be configured to perform one or more operations described herein in connection with FIGS. 6-10. Additionally, or alternatively, the apparatus 1300 may be configured to perform one or more processes described herein, such as process 1100 of FIG. 11, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The reception component 1302 may receive, from a network node, a configuration of an AGC symbol for an SSB-less carrier, wherein the SSB-less carrier and at least one carrier that transmits an SSB are included in a plurality of carriers for inter-band carrier aggregation. The reception component 1302 may receive, from the network node, an indication of activation of the SSB-less carrier. The measurement component 1308 may measure signal strength on the SSB-less carrier in the AGC symbol for the SSB-less carrier in accordance with the configuration of the AGC for the SSB-less carrier.

The AGC component 1310 may perform AGC for the SSB-less carrier based at least in part on the signal strength measured in the AGC symbol.

The reception component 1302 may receive, from the network node, a downlink communication on the SSB-less carrier based at least in part on the AGC for the SSB-less carrier.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
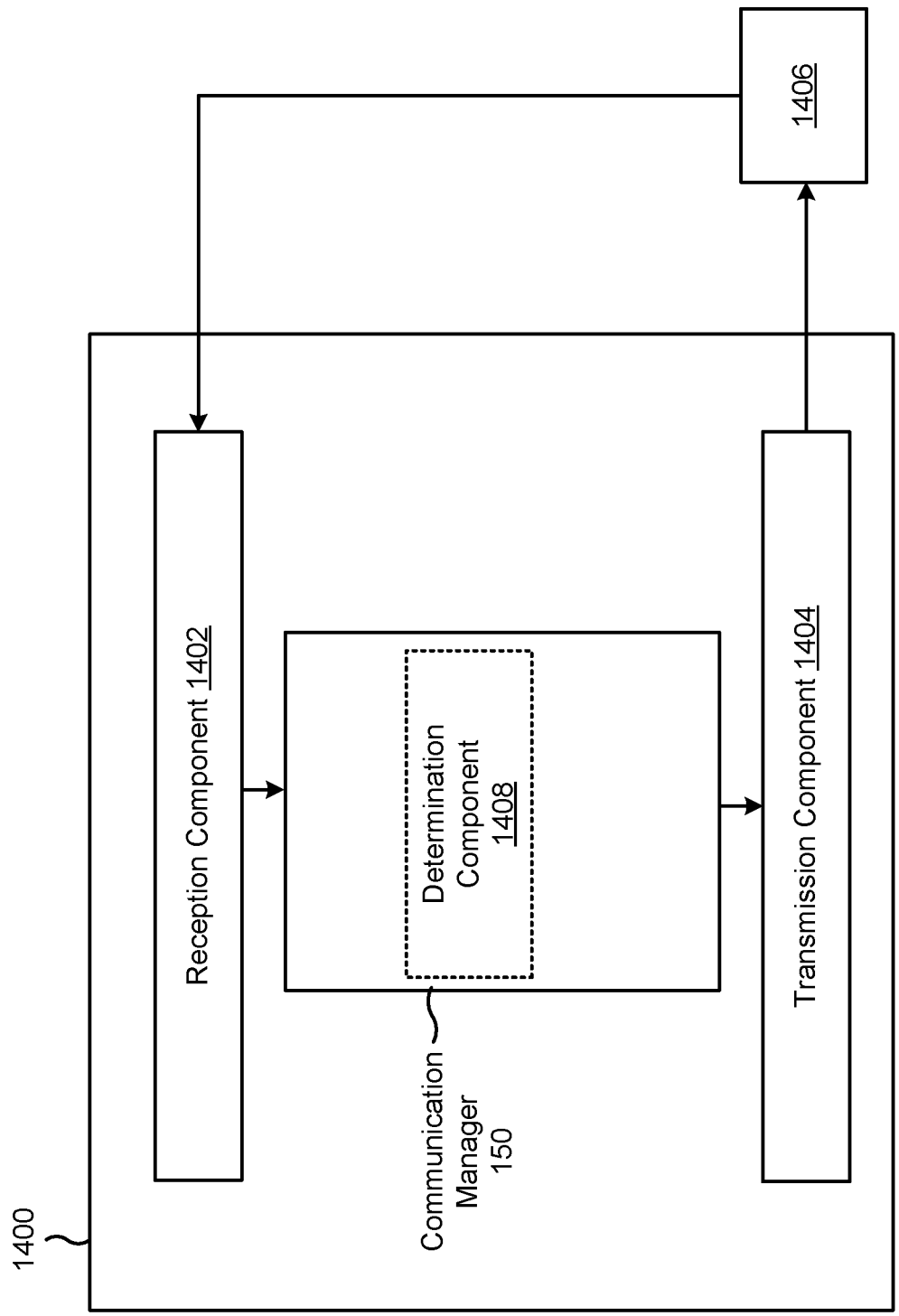

FIG. 14 is a diagram of an example apparatus 1400 for wireless communication, in accordance with the present disclosure. The apparatus 1400 may be a network node, or a network node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 150. The communication manager 150 may include a determination component 1408, among other examples.

In some aspects, the apparatus 1400 may be configured to perform one or more operations described herein in connection with FIGS. 6-10. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network node described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network node described in connection with FIG. 2. In some aspects, the transmission component 1404 may be co-located with the reception component 1402 in a transceiver.

The transmission component 1404 may transmit, to a UE, a configuration of an AGC symbol for an SSB-less carrier, wherein the SSB-less carrier and at least one carrier that transmits an SSB are included in a plurality of carriers for inter-band carrier aggregation. The transmission component 1404 may transmit, to the UE, an indication of activation of the SSB-less carrier. The transmission component 1404 may transmit, to the UE in the AGC symbol for the SSB-less carrier, a signal to be measured for AGC on the SSB-less carrier.

The determination component 1408 may determine the configuration of the AGC symbol for the SSB-less carrier for the UE.

The transmission component 1404 may transmit, to the UE, a downlink communication on the SSB-less carrier after transmitting, in the AGC symbol, the signal to be measured for AGC on the SSB-less carrier.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving, from a network node, a configuration of an automatic gain control (AGC) symbol for a synchronization signal block (SSB)-less carrier, wherein the SSB-less carrier and at least one carrier that transmits an SSB are included in a plurality of carriers for inter-band carrier aggregation; receiving, from the network node, an indication of activation of the SSB-less carrier; and measuring signal strength on the SSB-less carrier in the AGC symbol for the SSB-less carrier in accordance with the configuration of the AGC for the SSB-less carrier.

Aspect 2: The method of Aspect 1, further comprising: performing AGC for the SSB-less carrier based at least in part on the signal strength measured in the AGC symbol.

Aspect 3: The method of Aspect 2, further comprising: receiving, from the network node, a downlink communication on the SSB-less carrier based at least in part on the AGC for the SSB-less carrier.

Aspect 4: The method of any of Aspects 1-3, wherein the AGC symbol is a first symbol at a beginning of a slot including the AGC symbol.

Aspect 5: The method of Aspect 4, wherein the slot including the AGC symbol is a first slot, after the activation of the SSB-less carrier, in which a downlink communication is scheduled to be received by the UE on the SSB-less carrier.

Aspect 6: The method of any of Aspects 4-5, wherein a same signal is repeated in the AGC symbol and is a second symbol, subsequent to the AGC symbol, in the slot including the AGC symbol.

Aspect 7: The method of any of Aspects 4-6, wherein the slot including the AGC symbol does not include any physical downlink control channel (PDCCH) symbols.

Aspect 8: The method of any of Aspects 4-6, wherein the slot including the AGC symbol includes one or more physical downlink control channel (PDCCH) symbols that begin in a second symbol, subsequent to the AGC symbol, in the slot including the AGC symbol.

Aspect 9: The method of any of Aspects 1-3, wherein the AGC symbol is a last symbol at an end of a slot including the AGC symbol.

Aspect 10: The method of Aspect 9, wherein the slot including the AGC symbol is a last slot prior to a first slot, after the activation of the SSB-less carrier, in which a downlink communication is scheduled to be received by the UE on the SSB-less carrier.

Aspect 11: The method of any of Aspects 9-10, wherein a same signal is repeated in the AGC symbol as in a first symbol at a beginning of a next slot, subsequent to the slot including the AGC symbol.

Aspect 12: The method of any of Aspects 1-11, wherein a location of the AGC symbol in a slot including the AGC symbol is based at least in part on an offset value, included in downlink control information (DCI), between the DCI and a downlink communication scheduled by the DCI to be received by the UE on the SSB-less carrier.

Aspect 13: The method of Aspect 12, wherein, in connection with the offset value being equal to zero slots, the location of the AGC symbol is in a last symbol in the slot including the AGC symbol and the slot including the AGC symbol is a last slot prior to a slot in which the downlink communication is scheduled.

Aspect 14: The method of Aspect 12, wherein, in connection with the offset value being greater than zero slots, the location of the AGC symbol is a first symbol in the slot including the AGC symbol and the slot including the AGC symbol is one or more slots prior to the slot in which the downlink communication is scheduled.

Aspect 15: The method of any of Aspects 1-14, wherein the configuration of the AGC symbol for the SSB-less carrier indicates a periodicity of a slot including the AGC symbol for the SSB-less carrier.

Aspect 16: The method of Aspect 15, wherein measuring signal strength on the SSB-less carrier in the AGC symbol for the SSB-less carrier comprises: measuring the signal strength on the SSB-less carrier in the AGC symbol for the SSB-less carrier in each of one or more occasions of the slot including the AGC symbol for the SSB-less carrier based at least in part on the periodicity of the slot including the AGC symbol for the SSB-less carrier.

Aspect 17: A method of wireless communication performed by a network node, comprising: transmitting, to a user equipment (UE), a configuration of an automatic gain control (AGC) symbol for a synchronization signal block (SSB)-less carrier, wherein the SSB-less carrier and at least one carrier that transmits an SSB are included in a plurality of carriers for inter-band carrier aggregation; transmitting, to the UE, an indication of activation of the SSB-less carrier; and transmitting, to the UE in the AGC symbol for the SSB-less carrier, a signal to be measured for AGC on the SSB-less carrier.

Aspect 18: The method of Aspect 17, further comprising: transmitting, to the UE, a downlink communication on the SSB-less carrier after transmitting, in the AGC symbol, the signal to be measured for AGC on the SSB-less carrier.

Aspect 19: The method of any of Aspects 17-18, wherein the AGC symbol is a first symbol at a beginning of a slot including the AGC symbol.

Aspect 20: The method of Aspect 19, wherein the slot including the AGC symbol is a first slot, after the activation of the SSB-less carrier, in which a downlink communication is scheduled to be transmitted to the UE on the SSB-less carrier.

Aspect 21: The method of any of Aspects 19-20, wherein transmitting the signal to be measured for AGC on the SSB-less carrier comprises: transmitting a same signal in the AGC symbol as in a second symbol, subsequent to the AGC symbol, in the slot including the AGC symbol.

Aspect 22: The method of any of Aspects 19-21, wherein the slot including the AGC symbol does not include any physical downlink control channel (PDCCH) symbols.

Aspect 23: The method of any of Aspects 19-21, wherein the slot including the AGC symbol includes one or more physical downlink control channel (PDCCH) symbols that begin in a second symbol, subsequent to the AGC symbol, in the slot including the AGC symbol.

Aspect 24: The method of any of Aspects 17-18, wherein the AGC symbol is a last symbol at an end of a slot including the AGC symbol.

Aspect 25: The method of Aspect 24, wherein the slot including the AGC symbol is a last slot prior to a first slot, after the activation of the SSB-less carrier, in which a downlink communication is scheduled to be transmitted to the UE on the SSB-less carrier.

Aspect 26: The method of any of Aspects 24-25, wherein transmitting the signal to be measured for AGC on the SSB-less carrier comprises: transmitting a same signal in the AGC symbol as in a first symbol at a beginning of a next slot, subsequent to the slot including the AGC symbol.

Aspect 27: The method of any of Aspects 17-26, wherein a location of the AGC symbol in a slot including the AGC symbol is based at least in part on an offset value, included in downlink control information (DCI), between the DCI and a downlink communication scheduled by the DCI to be transmitted to the UE on the SSB-less carrier.

Aspect 28: The method of Aspect 27, wherein, in connection with the offset value being equal to zero slots, the location of the AGC symbol is in a last symbol in the slot including the AGC symbol and the slot including the AGC symbol is a last slot prior to a slot in which the downlink communication is scheduled.

Aspect 29: The method of Aspect 27, wherein, in connection with the offset value being greater than zero slots, the location of the AGC symbol is a first symbol in the slot including the AGC symbol and the slot including the AGC symbol is one or more slots prior to the slot in which the downlink communication is scheduled.

Aspect 30: The method of any of Aspects 17-29, wherein the configuration of the AGC symbol for the SSB-less carrier indicates a periodicity of a slot including the AGC symbol for the SSB-less carrier.

Aspect 31: The method of Aspect 30, wherein transmitting the signal to be measured for AGC on the SSB-less carrier comprises: transmitting the signal to be measured for the AGC on the SSB-less carrier in the AGC symbol for the SSB-less carrier in each of one or more occasions of the slot including the AGC symbol for the SSB-less carrier based at least in part on the periodicity of the slot including the AGC symbol for the SSB-less carrier.

Aspect 32: An apparatus for wireless communication at a device, comprising a processor; memory coupled with the processor; and instructions stored in the memory and executable by the processor to cause the apparatus to perform the method of one or more of Aspects 1-16.

Aspect 33: A device for wireless communication, comprising a memory and one or more processors coupled to the memory, the one or more processors configured to perform the method of one or more of Aspects 1-16.

Aspect 34: An apparatus for wireless communication, comprising at least one means for performing the method of one or more of Aspects 1-16.

Aspect 35: A non-transitory computer-readable medium storing code for wireless communication, the code comprising instructions executable by a processor to perform the method of one or more of Aspects 1-16.

Aspect 36: A non-transitory computer-readable medium storing a set of instructions for wireless communication, the set of instructions comprising one or more instructions that, when executed by one or more processors of a device, cause the device to perform the method of one or more of Aspects 1-16.

Aspect 37: An apparatus for wireless communication at a device, comprising a processor; memory coupled with the processor; and instructions stored in the memory and executable by the processor to cause the apparatus to perform the method of one or more of Aspects 17-31.

Aspect 38: A device for wireless communication, comprising a memory and one or more processors coupled to the memory, the one or more processors configured to perform the method of one or more of Aspects 17-31.

Aspect 39: An apparatus for wireless communication, comprising at least one means for performing the method of one or more of Aspects 17-31.

Aspect 40: A non-transitory computer-readable medium storing code for wireless communication, the code comprising instructions executable by a processor to perform the method of one or more of Aspects 17-31.

Aspect 41: A non-transitory computer-readable medium storing a set of instructions for wireless communication, the set of instructions comprising one or more instructions that, when executed by one or more processors of a device, cause the device to perform the method of one or more of Aspects 17-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        receive, from a network node, a configuration of an automatic gain control (AGC) symbol for a synchronization signal block (SSB)-less carrier, wherein the SSB-less carrier and at least one carrier that transmits an SSB are included in a plurality of carriers for inter-band carrier aggregation;
        receive, from the network node, an indication of activation of the SSB-less carrier; and
        measure signal strength on the SSB-less carrier in the AGC symbol for the SSB-less carrier in accordance with the configuration of the AGC symbol for the SSB-less carrier, wherein the configuration of the AGC symbol indicates a location of the AGC symbol within a slot including the AGC symbol, and wherein the slot including the AGC symbol includes one or more physical downlink control channel (PDCCH) symbols that begin in a symbol subsequent to the AGC symbol.

2. The UE of claim 1, wherein the one or more processors are further configured to:
    perform AGC for the SSB-less carrier based at least in part on the signal strength measured in the AGC symbol.

3. The UE of claim 2, wherein the one or more processors are further configured to:
    receive, from the network node, a downlink communication on the SSB-less carrier based at least in part on the AGC for the SSB-less carrier.

4. The UE of claim 1, wherein the AGC symbol is a first symbol at a beginning of the slot including the AGC symbol.

5. The UE of claim 4, wherein the slot including the AGC symbol is a first slot, after the activation of the SSB-less carrier, in which a downlink communication is scheduled to be received by the UE on the SSB-less carrier.

6. The UE of claim 4, wherein a same signal is repeated in the AGC symbol and in a second symbol, subsequent to the AGC symbol, in the slot including the AGC symbol.

7. The UE of claim 4, wherein the slot including the AGC symbol includes one or more physical downlink shared channel (PDSCH) symbols.

8. The UE of claim 4, wherein the symbol subsequent to the AGC symbol is a second symbol, subsequent to the AGC symbol, in the slot including the AGC symbol.

9. The UE of claim 1, wherein the AGC symbol is a last symbol at an end of the slot including the AGC symbol.

10. The UE of claim 9, wherein the slot including the AGC symbol is a last slot prior to a first slot, after the activation of the SSB-less carrier, in which a downlink communication is scheduled to be received by the UE on the SSB-less carrier.

11. The UE of claim 9, wherein a same signal is repeated in the AGC symbol as in a first symbol at a beginning of a next slot, subsequent to the slot including the AGC symbol.

12. The UE of claim 1, wherein the location of the AGC symbol in the slot including the AGC symbol is based at least in part on an offset value, included in downlink control information (DCI), between the DCI and a downlink communication scheduled by the DCI to be received by the UE on the SSB-less carrier.

13. The UE of claim 12, wherein, in connection with the offset value being equal to zero slots, the location of the AGC symbol is in a last symbol in the slot including the AGC symbol and the slot including the AGC symbol is a last slot prior to a slot in which the downlink communication is scheduled.

14. The UE of claim 12, wherein, in connection with the offset value being greater than zero slots, the location of the AGC symbol is a first symbol in the slot including the AGC symbol and the slot including the AGC symbol is one or more slots prior to the slot in which the downlink communication is scheduled.

15. The UE of claim 1, wherein the configuration of the AGC symbol for the SSB-less carrier indicates a periodicity of the slot including the AGC symbol for the SSB-less carrier.

16. The UE of claim 15, wherein the one or more processors, to measure the signal strength on the SSB-less carrier in the AGC symbol for the SSB-less carrier, are configured to:
measure the signal strength on the SSB-less carrier in the AGC symbol for the SSB-less carrier in each of one or more occasions of the slot including the AGC symbol for the SSB-less carrier based at least in part on the periodicity of the slot including the AGC symbol for the SSB-less carrier.

17. The UE of claim 1, wherein the AGC symbol is in a symbol other than a first symbol in the slot including the AGC symbol.

18. A network node for wireless communication, comprising:
a memory; and
one or more processors, coupled to the memory, configured to:
transmit, to a user equipment (UE), a configuration of an automatic gain control (AGC) symbol for a synchronization signal block (SSB)-less carrier, wherein the SSB-less carrier and at least one carrier that transmits an SSB are included in a plurality of carriers for inter-band carrier aggregation;
transmit, to the UE, an indication of activation of the SSB-less carrier; and
transmit, to the UE in the AGC symbol for the SSB-less carrier, a signal to be measured for AGC on the SSB-less carrier, wherein the configuration of the AGC symbol indicates a location of the AGC symbol within a slot including the AGC symbol, and wherein the slot including the AGC symbol includes one or more physical downlink control channel (PDCCH) symbols that begin in a symbol subsequent to the AGC symbol.

19. The network node of claim 18, wherein the one or more processors are further configured to:
transmit, to the UE, a downlink communication on the SSB-less carrier after transmitting, in the AGC symbol, the signal to be measured for AGC on the SSB-less carrier.

20. The network node of claim 18, wherein the AGC symbol is a first symbol at a beginning of the slot including the AGC symbol, and wherein the slot including the AGC symbol is a first slot, after the activation of the SSB-less carrier, in which a downlink communication is scheduled to be transmitted to the UE on the SSB-less carrier.

21. The network node of claim 18, wherein the AGC symbol is a last symbol at an end of the slot including the AGC symbol, and wherein the slot including the AGC symbol is a last slot prior to a first slot, after the activation of the SSB-less carrier, in which a downlink communication is scheduled to be transmitted to the UE on the SSB-less carrier.

22. The network node of claim 18, wherein the location of the AGC symbol in the slot including the AGC symbol is based at least in part on an offset value, included in downlink control information (DCI), between the DCI and a downlink communication scheduled by the DCI to be transmitted to the UE on the SSB-less carrier.

23. The network node of claim 18, wherein the configuration of the AGC symbol for the SSB-less carrier indicates a periodicity of the slot including the AGC symbol for the SSB-less carrier, and wherein the one or more processors, to transmit the signal to be measured for AGC on the SSB-less carrier, are configured to:
transmit the signal to be measured for the AGC on the SSB-less carrier in the AGC symbol for the SSB-less carrier in each of one or more occasions of the slot including the AGC symbol for the SSB-less carrier based at least in part on the periodicity of the slot including the AGC symbol for the SSB-less carrier.

24. A method of wireless communication performed by a user equipment (UE), comprising:
receiving, from a network node, a configuration of an automatic gain control (AGC) symbol for a synchronization signal block (SSB)-less carrier, wherein the SSB-less carrier and at least one carrier that transmits an SSB are included in a plurality of carriers for inter-band carrier aggregation;
receiving, from the network node, an indication of activation of the SSB-less carrier; and
measuring signal strength on the SSB-less carrier in the AGC symbol for the SSB-less carrier in accordance with the configuration of the AGC symbol for the SSB-less carrier, wherein the configuration of the AGC symbol indicates a location of the AGC symbol within a slot including the AGC symbol, and wherein the slot including the AGC symbol includes one or more physical downlink control channel (PDCCH) symbols that begin in a symbol subsequent to the AGC symbol.

25. The method of claim 24, further comprising:
performing AGC for the SSB-less carrier based at least in part on the signal strength measured in the AGC symbol.

26. The method of claim 24, wherein the AGC symbol is a first symbol at a beginning of the slot including the AGC symbol, and wherein the slot including the AGC symbol is a first slot, after the activation of the SSB-less carrier, in which a downlink communication is scheduled to be received by the UE on the SSB-less carrier.

27. The method of claim 24, wherein the AGC symbol is a last symbol at an end of the slot including the AGC symbol, and wherein the slot including the AGC symbol is a last slot prior to a first slot, after the activation of the SSB-less carrier, in which a downlink communication is scheduled to be received by the UE on the SSB-less carrier.

28. The method of claim 24, wherein the location of the AGC symbol in the slot including the AGC symbol is based at least in part on an offset value, included in downlink control information (DCI), between the DCI and a downlink communication scheduled by the DCI to be received by the UE on the SSB-less carrier.

29. The method of claim 24, wherein the configuration of the AGC symbol for the SSB-less carrier indicates a periodicity of the slot including the AGC symbol for the SSB-less carrier, and wherein measuring the signal strength on the SSB-less carrier in the AGC symbol for the SSB-less carrier comprises:
measuring the signal strength on the SSB-less carrier in the AGC symbol for the SSB-less carrier in each of one or more occasions of the slot including the AGC symbol for the SSB-less carrier based at least in part on the periodicity of the slot including the AGC symbol for the SSB-less carrier.

30. A method of wireless communication performed by a network node, comprising:
transmitting, to a user equipment (UE), a configuration of an automatic gain control (AGC) symbol for a synchronization signal block (SSB)-less carrier, wherein the SSB-less carrier and at least one carrier that transmits an SSB are included in a plurality of carriers for inter-band carrier aggregation;

transmitting, to the UE, an indication of activation of the SSB-less carrier; and transmitting, to the UE in the AGC symbol for the SSB-less carrier, a signal to be measured for AGC on the SSB-less carrier, wherein the configuration of the AGC symbol indicates a location of the AGC symbol within a slot including the AGC symbol, and wherein the slot including the AGC symbol includes one or more physical downlink control channel PDCCH) symbols that begin in a symbol subsequent to the AGC symbol.

* * * * *